US012527721B2

(12) United States Patent
Caliandro

(10) Patent No.: US 12,527,721 B2
(45) Date of Patent: Jan. 20, 2026

(54) DEVICE AND METHOD FOR SORTING SMALL PIECES OF MATERIAL INTO SEPARATE CONTAINERS

(71) Applicant: Tom Caliandro, Weybridge, VT (US)

(72) Inventor: Tom Caliandro, Weybridge, VT (US)

( * ) Notice: Subject to any disclaimer, the term of this patent is extended or adjusted under 35 U.S.C. 154(b) by 53 days.

(21) Appl. No.: 18/545,616

(22) Filed: Dec. 19, 2023

(65) Prior Publication Data

US 2025/0195328 A1 Jun. 19, 2025

(51) Int. Cl.

*A61J 1/03* (2023.01)
*A61J 7/04* (2006.01)

(52) U.S. Cl.

CPC .. *A61J 1/03* (2013.01); *A61J 7/04* (2013.01)

(58) Field of Classification Search

CPC ...................................... A61J 7/04; A61J 1/03
See application file for complete search history.

(56) References Cited

U.S. PATENT DOCUMENTS

| | | | |
|---|---|---|---|
| 3,545,164 A | 12/1970 | Middleton | |
| 5,829,632 A | 11/1998 | Gehlert et al. | |
| 6,779,663 B1 | 8/2004 | Pocsi | |
| 7,334,699 B2 * | 2/2008 | Keffeler | G07F 17/0092 221/268 |
| 7,828,148 B2 | 11/2010 | Gibson | |
| 7,886,508 B2 | 2/2011 | Yuyama et al. | |
| 8,584,434 B2 | 11/2013 | Kodama et al. | |
| D702,273 S | 4/2014 | Kim | |
| 9,095,497 B1 | 8/2015 | Prince | |
| 9,561,154 B1 | 2/2017 | Kostelac | |
| 10,391,027 B1 | 8/2019 | Pande | |
| 11,419,793 B2 * | 8/2022 | Stevens | G07F 11/44 |
| 2010/0237089 A1 | 9/2010 | Kodama et al. | |
| 2011/0154780 A1 | 6/2011 | Kodama | |
| 2013/0056385 A1 | 3/2013 | Thompson et al. | |

FOREIGN PATENT DOCUMENTS

| | | |
|---|---|---|
| WO | 2006090761 | 8/2006 |

* cited by examiner

*Primary Examiner* — Jason K Niesz
(74) *Attorney, Agent, or Firm* — Caldwell Intellectual Property Law

(57) ABSTRACT

A device for sorting small pieces of material into separate containers includes a top portion having lateral troughs, each including a bottom surface, at least a well therein, and at least a through opening in a bottom of the at least a well. The device includes a bottom portion including a substantially planar surface having a plurality of openings disposed therethrough and a plurality of sections of unbroken surface. Each opening of the plurality of openings and section of the plurality of sections of unbroken surface corresponds to an opening of the at least a through opening of the two lateral troughs, and the top portion and bottom portion are mutually slidable between a first position where the plurality of sections of unbroken surface are beneath the at least a through opening and a second position in which the plurality of openings are beneath the at least a through opening.

18 Claims, 15 Drawing Sheets

DEVICE AND METHOD FOR SORTING SMALL PIECES OF MATERIAL INTO SEPARATE CONTAINERS

FIELD OF THE INVENTION

The present invention generally relates to the field of sorting mechanisms. In particular, the present invention is directed to a device and method for sorting small pieces of material into separate containers.

BACKGROUND

The use of medication in pill or capsule form to treat, alleviate, or prevent medical issues has never been greater than at present. It is common for a person to consume several different types of pills every day, each with a different dosage amount and schedule.

SUMMARY OF THE DISCLOSURE

In an aspect, a device for sorting small pieces of material into separate is disclosed. The device comprises a top portion with two lateral troughs, each containing at least a well with a through opening, and a bottom portion with multiple openings and unbroken surface sections that correspond with the through openings in the lateral troughs. These portions are mutually slidable between two positions, allowing for different sorting configuration. The device may include additional features such as a central trough, a manual actuator for shifting between positions, a biasing means for maintaining a default position, and lateral grooves for secure engagement of the bottom portion.

In another aspect, a method for sorting small pieces of material is disclosed. This method involves receiving a device for sorting small material, applying and aligning the top portion of the device, shifting between the first and the second position, leading to efficient sorting of the material into separate containers. This method can leverage the central trough, manual actuator, and biasing means to facilitate the sorting process, resulting in a user-friendly and efficient operation.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to a device that enables a user to sort pills into pill organizers efficiently and quickly. Device includes wells corresponding to pill organizers receptacles; each well has an opening at its bottom blocked by a slidable piece of material. Sliding the piece of material, which may be accomplished using a lever actuator, may align openings therein with the openings in the bottoms of the wells, allowing medication to fall through and into the receptacle, such as a pill organizer below. A central trough between banks of wells provides a user with a convenient place to place or dump pills prior to sorting, and troughs around each set of wells help to prevent spillage. A biasing means may keep the slidable element in a position to retain pills in the wells until the user has had a chance to review the contents thereof.

Figure 1:
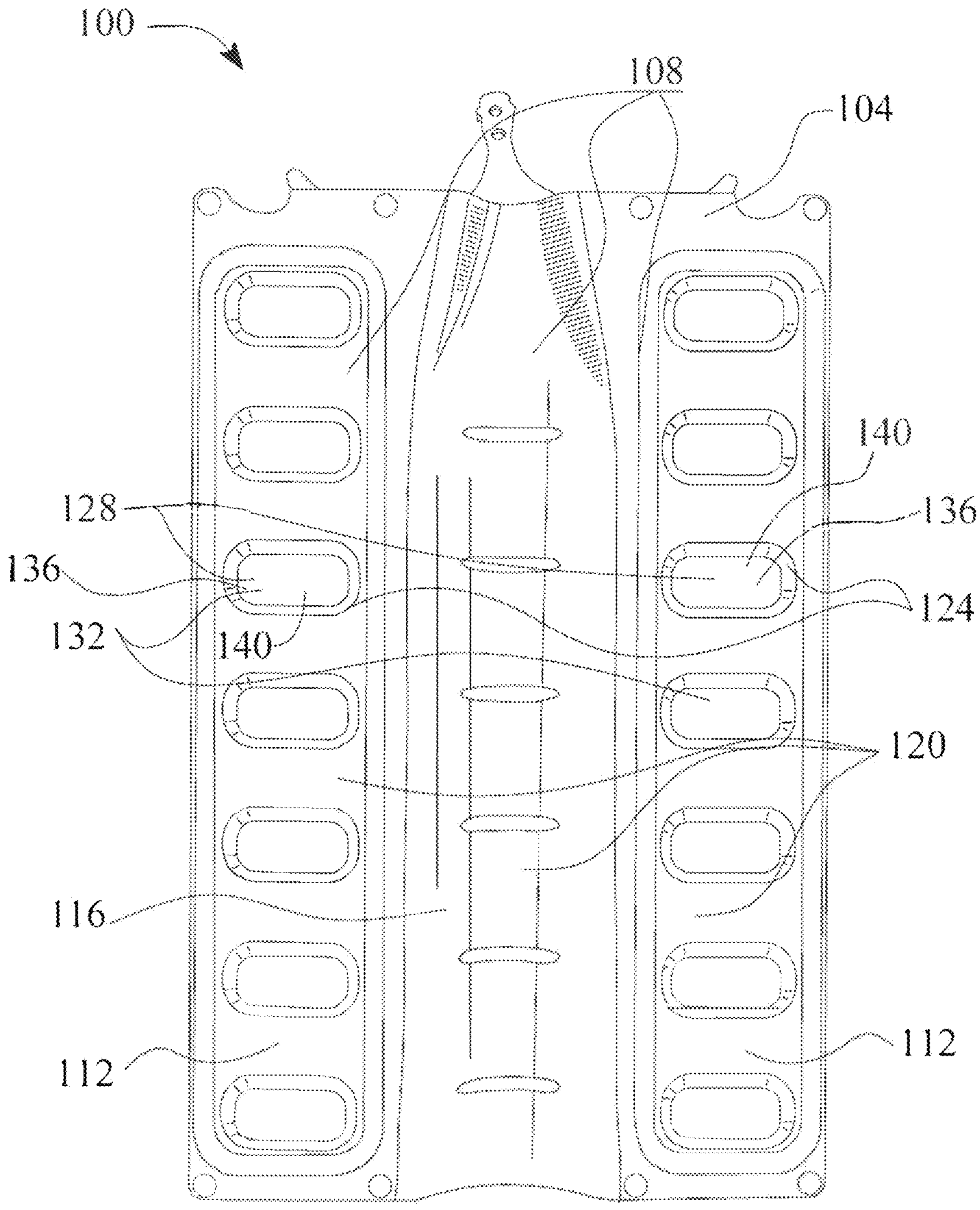
FIG. 1 is a schematic diagram of a top view of an exemplary embodiment of a device.

Referring now to FIG. 1, an exemplary embodiment of a device 100 for sorting small pieces of material into separate containers is illustrated. In an embodiment, the device 100 includes a top portion 104. Top portion 104 may be constructed of any suitable material or any combinations of suitable materials, including without limitation artificial or natural polymer materials such as plastics, metals, natural materials such as wood, composite material such as fiberglass, ceramics, or any recycled materials, and the like. Top portion 104 may be manufactured according to any method including without limitation molding, including injection molding, extrusion, subtractive manufacturing processes such as machining, and/or additive processes such as fuse deposition, stereolithography, or other rapid prototyping or "three-dimensional printing" processes.

Still referring to FIG. 1, top portion 104 includes at least a trough 108. As used in this disclosure, a "trough" refers to a long, narrow, open container or channel designed to hold, contain, or direct the flow of materials. Trough 108 is a component of the top portion 104, structured to hold and direct the small pieces of material during the sorting progress. At least a trough 108 may include one or more lateral troughs 112. A "lateral trough," as described in this disclosure, refers as a trough positioned to the side or at an angle to the main direction of flow or alignment. In an embodiment, at least a trough 108 may include two lateral troughs 112. At least a trough 108 may include a central trough 116 disposed between two lateral troughs 112; central trough 116 may be deeper than two lateral troughs 112. Within the context of this disclosure, "central trough" refers to a tough located between lateral troughs. Central trough 116 may be disposed between the two lateral troughs 112 function as the primary receptacle or channel for materials. In an embodiment, central trough 116 may act as an initial repository into which a user may empty a plurality of small pieces of material and from which the user may distribute the small pieces of material to lateral troughs 112 and/or wells as introduced hereinbelow; plurality of small pieces of material may be, as a non-limiting example, a plurality of pills. "Pills" as used herein are pieces of material having a substantially solid exterior or membrane which are taken internally to deliver one or more medicinal materials to the body of a user. Pills may also include tablets, tabs, pearls, lozenges, pellets, capsule, or the like. One or more medicinal materials may include any active, passive or time released pharmacological chemicals or compounds for treatment, alleviation, or prevention of medical symptoms, including without limitation analgesics, antibiotics, chemicals or compounds to aid in metabolic or endocrinological disorders such as diabetes or hypertension, psychoactive chemicals or compounds, diuretics, dietary and herbal supplements, or vitamins. Pills may include solid pills, gel capsules, or any other material composition recognized as pills by person skilled in the art or by users. Pills may be taken orally by swallowing, sublingual administration, buccal, sublabial or chewing and/or by other orifices. Each trough of at least a trough 108 includes a bottom surface 120. Bottom surface 120 may be a surface on which small pieces of material rest when placed into at least a trough 108. Materials can also include without limitation other objects to be sorted such as seeds, buttons and sewing fixtures, fasteners, nuts and bolts, dental supplies, stones, pebbles, gems, beads, and/or decorative media.

With continued reference to FIG. 1, top portion 104 may include at least a well 124. At least a well 124 may be a depression or recess formed in a surface of top portion 104. As described in this disclosure, "well" refers to a recess or depression created within the surface of top portion 104. Specifically, in some embodiments, a well 124 may be formed within the bottom surface 120 of one or more troughs 108. Functionally, a well 124 can act as a secondary receptacle within the troughs, helping in further segregation or storage of the sorted materials. In an embodiment, at least a well 124 may include at least a well 124 formed in bottom surface 120 of each of two lateral troughs 112. At least a well 124 may include a plurality of wells formed in bottom surface 120 of each lateral trough of two lateral troughs 112. Plurality of wells may have a quantity corresponding to a number of times pills must be taken; for instance, plurality of wells may include one well per day of the week, two wells per day of the week, one well per fractional division of a week, day, or any time dependent interval or moments or other unit of time, or the like. In an embodiment, plurality of wells includes seven wells formed in a first lateral trough of two lateral troughs 112 and seven wells formed in a second lateral trough of two lateral troughs 112. Wells may be spaced to correspond to spacing of receptacles in pill organizer boxes, such as boxes having a receptacle per day of the week, two receptacles per day of the week, or any other difference in the number of receptacles in any series of time dependent moments. In an embodiment, wells may be so spaced to permit device 100 solely or in combination with more than one to be placed on top of such a pill organizer and used to deposit pills or other small pieces of material into receptacles of pill organizer or any other set of one or more receptacles sorted by device, as described in further detail below. Well 124 may also take on various shapes depending on its designated function and the overall design of the device 100. For example, a well may have a circular cross-section, forming a cylindrical depression in the trough's bottom surface. This shape may be particularly effective in guiding materials towards the center of the well due to its curved sides. Alternatively, well 124 may have a square or rectangular cross-section. Such shape may create wells with flat bottoms and straight sides, potentially maximizing the well's volume for storing materials, or facilitating different interaction dynamics with the materials. Well 124 may also have other polygonal shapes such as triangular, pentagonal, or hexagonal cross-sections. These shapes may be beneficial for certain specific sorting or storage requirements, or to influence the flow of materials in a particular way.

Continuing to refer to FIG. 1, receptacles may include, without limitation, pill organizers, pill bottles, jars, bottles, flasks, boxes, pouches, and/or any other containers that may be used to store pills and/or other materials or items to be sorted. Undersides of apparatus and/or wells may be shaped to engage various different upper openings of receptacles. For instance, and without limitation, undersides of apparatus and/or wells may have inverted funnel shapes, and/or may be formed into elastomeric sleeves made, for instance, of medical-grade silicone or other rubbers, either of which may rest on and/or stretch around one or more receptacle openings.

Still viewing FIG. 1, each well of at least a well 124 may have a through-opening 128 in a bottom of at least a well 124; bottom of at least a well 124 may be a location within the at least a well 124 to which a small piece of material settles under the influence of gravity when placed in the at least a well 124. Through-opening 128 may occupy substantially all of bottom of at least a well 124, so that a small piece of material placed in at least a well 124 will fall through through-opening 128 into or onto whatever is placed beneath at least a well 124, unless through-opening 128 is occluded by another object such as bottom portion 132 as described in further detail below.

Still referring to FIG. 1, device 100 includes a bottom portion 132. Bottom portion 132 may be constructed of any material or combination of materials suitable for the construction of top portion 104; bottom portion 132 may be constructed using any manufacturing technique suitable for the construction of top portion 104. Bottom surface 120 may be slidably engaged to top portion 104, permitting top portion 104 and bottom portion 132 to be mutually slidable between a first position and a second position. Bottom portion 132 includes an upper surface 136. Upper surface 136 may be substantially planar. Upper surface 136 includes at least a section of unbroken surface 140; at least a section of unbroken surface 140 may include a plurality of sections of unbroken surface. At least a section of unbroken surface 140 may be disposed beneath through-opening 128 when top portion 104 and bottom portion 132 are in the first position; in an embodiment, this may cause at least a section of unbroken surface 140 to act as a bottom of at least a well 124, preventing a piece of solid material paced therein from falling through through-opening 128 while top portion 104 and bottom portion 132 are in first position.

Still referring to FIG. 1, top portion 104 and bottom portion 132 of device 100 may be designed to be hingedly connected, providing an enhanced level of flexibility and adaptability in the operational setup of the device. The hinge connection not only allows for an efficient sliding interaction between the top and bottom portions but also contributes to the compactness of the device when not in use. Each trough 108 of top portion 104 may be further configured to be telescopically adjustable. The telescopic adjustability of the troughs signifies that each trough 108 can be extended or retracted in length, adjusting to the user's needs and preferences. The integration of telescopic adjustability within each trough adds an additional layer of versatility to the device, allowing for a customized operational setup based on specific usage scenarios. Consider a non-limiting example where device 100 is utilized in a healthcare facility to sort a variety of medication pills for different patients. Given the diverse medication requirements of the patients, the user may need to sort various quantities of pills. In such a scenario, the user may extend two lateral troughs 112 to create more wells for larger sorting tasks. For smaller sorting tasks, two lateral troughs 112 may be retracted, creating fewer wells and thereby conserving space. When device 100 is not in use or needs to be transported, the telescopic nature of the troughs 112 and the hinged connection between top portion 104 and bottom portion 132 allow the device to be compacted, thereby saving space and ensuring easy portability. Bottom portion 132 may be folded onto top portion 104, and two lateral troughs 112 may be retracted, resulting in a compact form factor that is easy to store or transport. The ability of device 100 to compact adds to its practicality and ease of use, making it a valuable tool for tasks involving the sorting of small pieces of material.

Figure 2A:
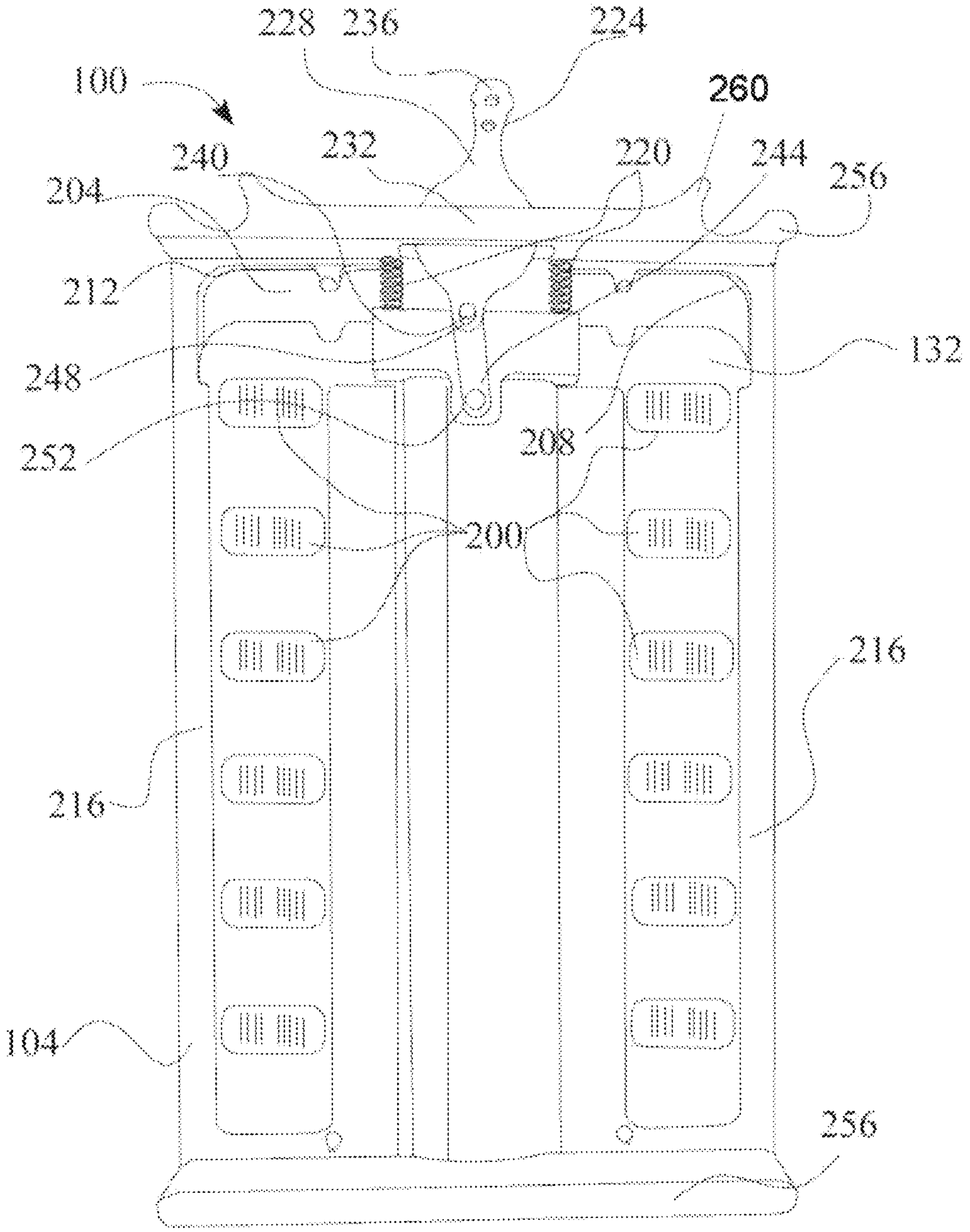
FIG. 2A is a schematic diagram of a bottom view of an exemplary embodiment of a device.
Figure 2B:
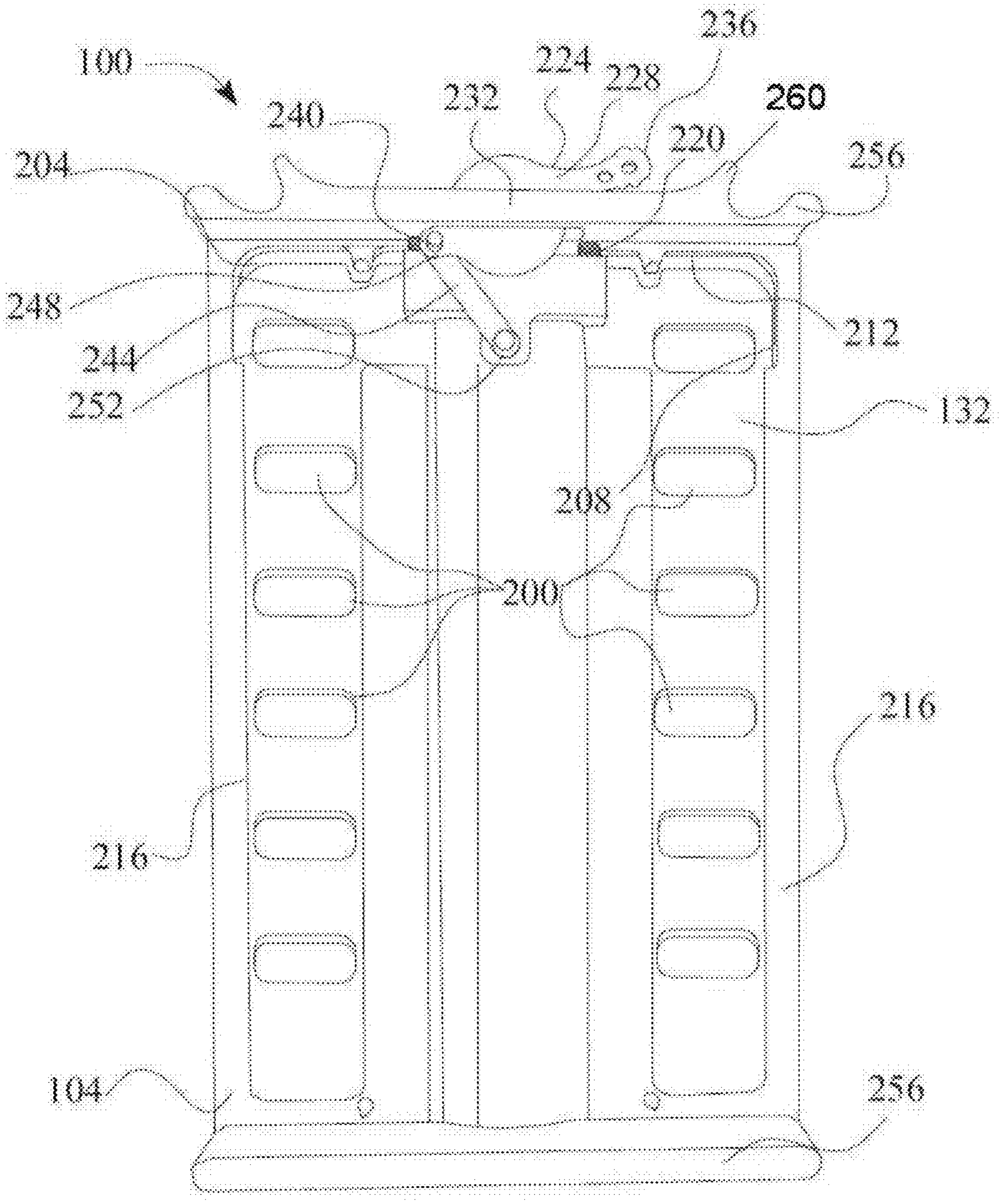
FIG. 2B is a schematic diagram of a bottom view of an exemplary embodiment of a device.

Referring now to FIGS. 2A-B, a bottom view of an exemplary embodiment of device 100 is illustrated; FIG. 2A illustrates an exemplary embodiment of device 100 with top portion 104 and bottom portion 132 in first position, while FIG. 2B illustrates an exemplary embodiment of device 100 with top portion 104 and bottom portion 132 in second position. Bottom portion 132 includes at least an opening 200. At least an opening 200 may include one opening per through-opening 128. In an embodiment, when top portion 104 and bottom portion 132 are in second position, each opening of at least an opening 200 is under a through-opening 128 of at least a well 124; each through-opening 128 of at least a well 124 may have an opening of at least an opening 200 positioned beneath it when top portion 104 and bottom portion 132 are in second position. Consequently, when top portion 104 and bottom portion 132 are in second position, small pieces of material placed in at least a well 124 may fall through through-opening 128 and at least an opening 200, and into or onto objects below, including without limitation receptacles of pill-organizers as described above.

With continued reference to FIGS. 2A-B, top portion 104 may include a recess 208. Bottom portion 132 may be placed within recess 208. Recess 208 may restrict motion of bottom portion 132 relative to top portion 104; for instance, recess 208 may have two lateral sides 204 restricting sliding motion of bottom portion 132 to a single axis of linear movement. Recess 208 may have an end wall 212 that halts sliding motion of bottom portion 132 relative to top portion 104 at first position, second position or both. Top portion 104 and/or bottom portion 132 may include one or more features to restrict bottom portion 132 to slidable engagement with top portion 104; for instance, one or more surfaces of top portion 104 may be disposed beneath a bottom surface 120 of bottom portion 132 that is opposite top surface, blocking any removal of bottom portion 132 from slidable engagement with top portion 104. As a non-limiting example, top surface may have one or more grooves 216 in which one or more edges of bottom portion 132 are slidably engaged; for instance, two lateral sides 204 of bottom portion 132 may be inserted in two lateral grooves 216 running parallel to a direction in which bottom portion 132 slides relative to top portion 104. In other words, two lateral grooves 216 may be grooves 216 placed in lateral sides 204 of recess 208.

Still referring to FIGS. 2A-B, top portion 104 may include additional refinements to enhance the operational utility of the device. Specifically, top portion 104 may incorporate lateral grooves 216. When present, lateral grooves 216 may be designed to offer at least one locking position to enhance the placement of bottom portion 132. This optional locking position, if utilized, may play a significant role in stabilizing the relative position of bottom portion 132 in either the first or second position. This locking position may play a crucial role in maintaining the relative position of bottom portion 132 in either the first or second position, ensuring a secure alignment of the openings for effective material sorting. The locking position may be defined by a recess or detent within the lateral grooves 216, which may be configured to accommodate a corresponding protrusion or tab on the sides of the bottom portion 132. As a non-limiting example, when the bottom portion 132 is slid to the first position, a tab on the bottom portion 132 may align with and engage the recess within lateral groove 216, creating a secure lock that helps to maintain the positional stability of bottom portion 132. This locking mechanism may operate as a positive stop that restricts uncontrolled sliding movement of bottom portion 132. Similarly, when the bottom portion 132 is moved to the second position, the tab may align with a second recess or detent within lateral grooves 216, creating another secure lock. This locked state significantly reduces the likelihood of unwanted positional shifts of the bottom portion 132 due to external influences or internal tensions. The presence of the locking position within lateral grooves 216 delivers a robust and user-friendly operation, allowing for a secure and controlled sorting process, and reducing the chances of misalignment and sorting errors.

Still referring to FIGS. 2A-B, device 100 may include a biasing means 220. In the context of this disclosure, "biasing means" refers to any mechanism or device that applies force to return a system to its original position or state after it has been displaced. Biasing means 220 may include, without limitation, at least a spring. At least a spring may be a coiled spring, such as without limitation a coiled helical spring, a spiral spring, a leaf spring, or the like. Biasing means 220 may include other means such as one or more strips or pieces of elastic material, a weight attached to a cable, polymer strip bent and poised to straighten, or the like. In an embodiment, biasing means 220 may have a bias urging the top portion 104 and bottom portion 132 into the first position; as a result, when not interfered with by outside action such as movement by a user, top portion 104 and bottom portion 132 may tend to remain in first position, so that objects placed within at least a well 124 are supported by at least a section of unbroken surface 140 and do not fall through.

With continued reference to FIGS. 2A-B, device 100 may include a manual actuator 224 that shifts the top portion 104 and bottom portion 132 between the first position and the second position when activated by a user; manual actuator 224 may, for instance, cause top portion 104 and bottom portion 132 to slide relative to one another into second position or predetermined position in opposition to bias of biasing means 220, which may cause return of top portion 104 and bottom portion 132 to first position when the user ceases use of manual actuator 224. Manual actuator 224 may include an extension of top portion 104, bottom portion 132, or both that user pushes or pulls or moves in a horizontal or vertical position to slide top portion 104 and bottom portion 132 between first position and first position. Manual actuator 224 may include various components to facilitate the pivotal connection between top portion 104 and bottom portion 132. One such component may be a lever 228 that employs a fulcrum 232, which is pivotally connected to a first portion of the top portion 104 and the bottom portion 132. First portion may refer to either the top portion 104 or bottom portion 132. However, it should be noted that while a lever-based system provides an effective means of operation, manual actuator 224 is not limited to such a mechanism. In other embodiments, a slider may also be used as an alternative to a lever. In such a configuration, the slider may move along a designated path or track, providing a similar operational capability as lever 228 and fulcrum 232 arrangement, but through a linear motion. The choice between a lever or slider system may be determined based on factors such as design preferences, operational requirements, or manufacturing constraints. In both cases, the objective remains the same—to provide an efficient and reliable means of pivotally connecting the top and bottom portions of the device 100. First portion of top portion 104 and bottom portion 132 may be the top portion 104 or the bottom portion 132. For instance, FIGS. 2A-B illustrate an exemplary embodiment in which first portion is top portion 104. Lever 228 may include a distal end 236 operated by the user. Lever 228 may include a proximal end 240 connected to a second portion of the top portion 104 and the bottom portion 132; where first portion is top portion 104, second portion may be bottom portion 132, and where first portion is bottom portion 132, second portion may be top portion 104. For instance, FIGS. 2A-B illustrate an exemplary embodiment in which second portion is bottom portion 132. Proximal end 240 may be directly connected to second portion; alternatively, proximal end 240 may be connected to the second portion by a crank slider 244 having a first end 248 pivotally connected to the proximal end 240 and a second end 252 pivotally connected to the second portion.

In some embodiments, device 100 may include an alternative actuation method, lever 224 may be replaced with a mechanical or electric actuator. The mechanical actuator may leverage various mechanical principles to convert rotational or linear motion into another form of motion or force, thereby enabling the activation of device 100. For example, mechanical actuators may include gear system, cam followers, or linkages, among others. In other embodiments, an electronic actuator may utilize electric energy, converted into mechanical energy, to facilitate the activation of device 100. This may encompass a range of components, such as electric motors, piezoelectric devices, or even electromagnetic devices. The use of electronic actuators may provide more precise control over the activation proofs and may also offer added benefits such as programmability or remote operation capabilities.

Still referring to FIGS. 2A-B, device 100 may include one or more structural elements 256 to support device 100 when in operation. Structural elements 256 may be constructed from a variety of materials depending on specific requirements, including but not limited to, metal, plastic, wood, or composite materials. Each of these materials offers different advantages, such as durability, strength, lightweight properties, or cost-effectiveness. Additionally, structural elements 256 may feature enhancements to improve functionality and user experience. For instance, rubber or rubber pads may be affixed to structural elements 256. The use of rubber or rubber pads not only provides additional grip to prevent unwanted movement of device 100 during operation, but also protects the underlying surface on which the device is placed from potential scratches or damage. Moreover, structural elements 256 may be designed with foldable mechanism, enhancing the portability and storage convenience of device 100. The foldable feature may be beneficial in context where space is at a premium or where the device needs to be frequently moved to stored away. One or more structural elements 256 may rest on a surface on which device 100 is placed when in operation. One or more structural elements 256 may rest on or engage a receptacle into which small pieces of material are to be deposited using device 100 as described in further detail below.

Still referring to FIGS. 2A-2B, device 100 may incorporate one or more hooks 260. The term "hook", within the context of this disclosure, refers to a component of device 100 that operates as a locking mechanism. It may align and lock the bottom portion 132 within the end well 212. The primary function of hook 260 may be to mitigate undesired relative sliding motion between the bottom portion 132 and the top portion 104 when the device is in the first position. In effect, hook 260 may help to stabilize and secure the device 100 in its intended placement. This contributes to the overall stability of the device, ensuring a consistent and reliable performance during the sorting process. In practice, hook 260 may manifest in different forms. It may be a simple curved or angled structure that physically engages with another component, such as a lip or edge on bottom portion 132 or end well 212. Alternatively, hook 260 may take on more complex designs such as a latch or catch mechanism that securely locks into place with a corresponding structure on the bottom portion 132 or end well 212. Regardless of the specific design, the underlying principle remains that hook 260 serves as a locking mechanism to stabilize the device 100 and prevent undesired motion. The particular design and implementation of hook 260 may vary based on the specific requirements and constraints of the application, material selection, manufacturing process, and other relevant factors.

Still referring to FIGS. 2A-B, mechanical or electronic actuators may be effectively controlled through the use of a button, switch, or similar activation element. This may further streamline the operation of device 100 by providing a simple, user-friendly interface. The button or switch may be strategically placed at various locations on device 100. For example, it may be positioned near the handle of the device, allowing for easy access while carrying or operating the device. Alternatively, the button or switch may be located on the main body of the device, in a position easily visible and accessible to a user standing in front of the device. In terms of its form and function, the button or switch may be a simple push-button, a toggle switch, or even a sliding switch. Its main purpose is to activate or deactivate the mechanical or electronic actuator, thereby controlling the operation of the device. The button or switch may also include indicator lights or other visual cues to inform the user of the current operational status of the device.

With continued reference to FIG. 2A-B, in another embodiment of device 100, the inclusion of a controller may streamline the operation of the mechanical or electronic actuator. The "controller," in this context, is an electronic component, system, or unit that manages the functionalities of the actuator. It can operate autonomously or be programmed to respond to signals or inputs from other elements of the device, such as a button or switch. The controller may be designed to automatically activate the actuator upon receiving a signal from the button or switch, essentially linking the user's manual command to the automatic action of the actuator. This responsive action may range from the initiation of the sliding or clicking sequence of top portion 104 and bottom portion 132 to the adjustment of the device's position or alignment. The controller may also be configured to operate the actuator independently, based on pre-set criteria or programmed instructions. This may encompass automated adjustments of the actuator's functionality to ensure optimal operation, for example, controlling the speed, direction, or force of the actuator.

Still referring to FIGS. 2A-B, each lateral trough of top portion 104 may further comprise a plurality of wells. Each well 124 is equipped with through-opening 128. The incorporation of multiple wells within each lateral trough provides an efficient means for sorting and organizing materials, such as medication pills, into predetermined groups. As a non-limiting example, consider a case where a user is tasked with organizing a week's supply of different types of medication pills for a patient. Each lateral trough may represent a specific day of the week, and each well 124 within specific lateral trough may represent a specific time of the day when a specific medication is required. In operation, the user may place the appropriate medication pills into the wells for the corresponding day and time. When top portion 104 and bottom portion 132 are in the first position, unbroken surface 140 of bottom portion 132 may prevent the pills from falling through through-openings 128. This allows the user to review the pill arrangement and make necessary adjustments without the pills falling out. Once the user confirms that the correct pills are in the correct wells, the user may slide bottom portion 132 to the second position. In this position, each through-opening 128 of the wells 124 aligns with the corresponding at least an opening 200 in bottom portion 132. The pills may then fall through aligned through-openings 128 and openings 200 into a receptacle positioned beneath device 100. Device 100 thus offers a user-friendly method for organizing medication pills or similar small pieces of material. The multiple wells in each lateral trough 112 allow for efficient sorting of materials based on predetermined criteria, such as time of day and day of the week for medication pills.

Referring generally to FIGS. 1-2B, in operation, a user may deposit one or more small pieces of material in at least a well 124 while top portion 104 and bottom portion 132 are in first position; user may deposit a plurality of small pieces of material in a plurality of wells. In an embodiment, user may place a plurality of small pieces of material belonging to a plurality of distinct types in at least a well 124; for instance, user may have to take a first number of a first pill type per day and a second number of a second pill type per day and may place corresponding quantities of the first pill type and the second pill type in each well of at least a well 124. Placement of material in at least a well 124 may include placement in central trough 116; for instance, user may empty one or more containers of pills into central trough 116, and then move or push desired quantities of each type of pill into wells in lateral troughs 112. Lateral troughs 112 may aid in preventing spillage of pills and in directing a path of motion of pills into at least a well 124. User may inspect pills placed into each well of at least a well 124 to ensure the correct quantity of each pill has been placed. User may place device 100 on top of a pill organizer or the like, either prior to or after placing pills in wells. User may move bottom portion 132 and top portion 104 into second position, for instance using manual actuator 224. This process may be repeated with multiple pill organizers until supply of pills in central trough 116, or in containers user empties into central trough 116, has been exhausted.

Figure 3A:
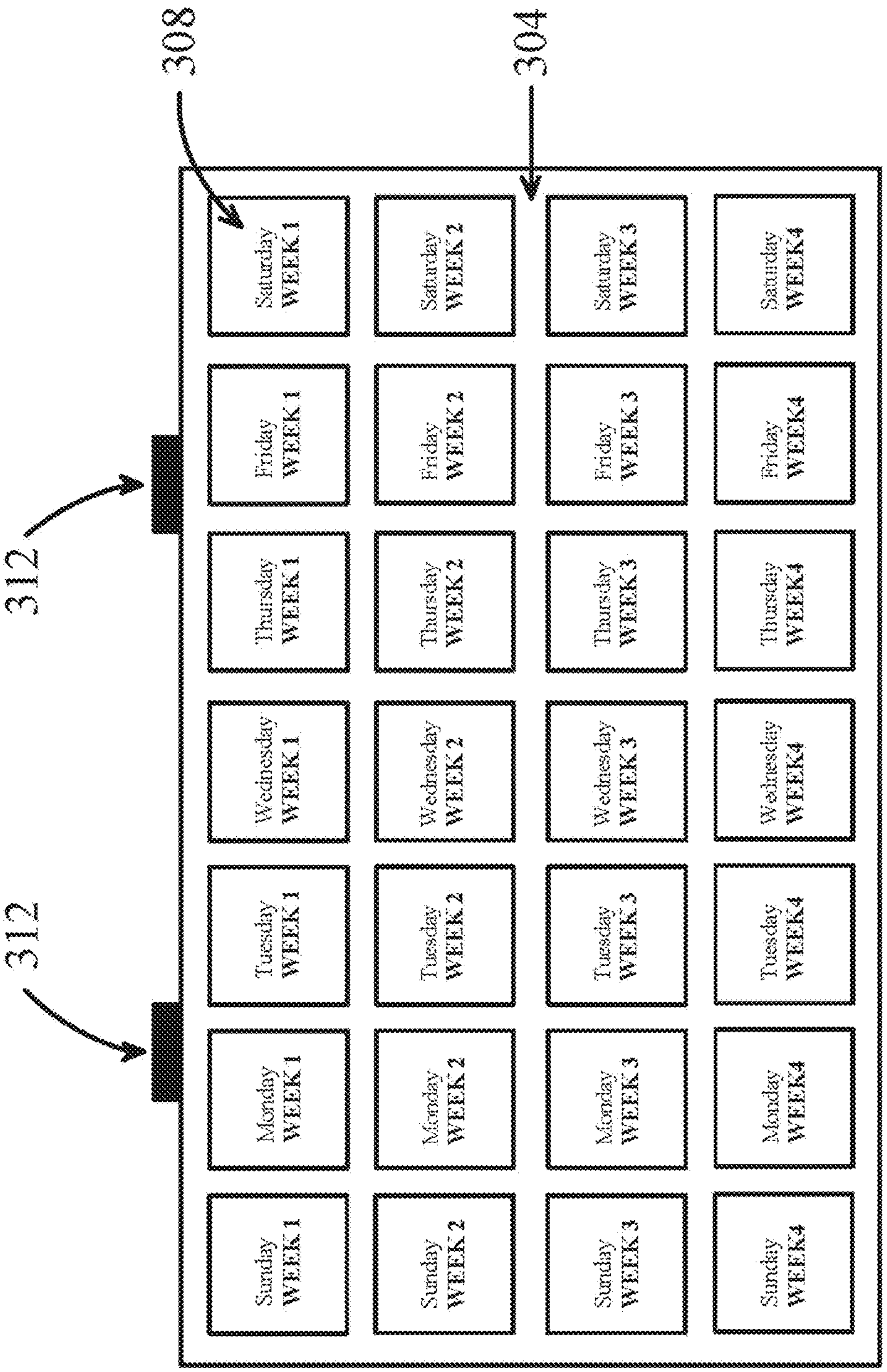
FIG. 3A is an illustration of an exemplary embodiment of a hinged monthly pill planner.
Figure 3B:
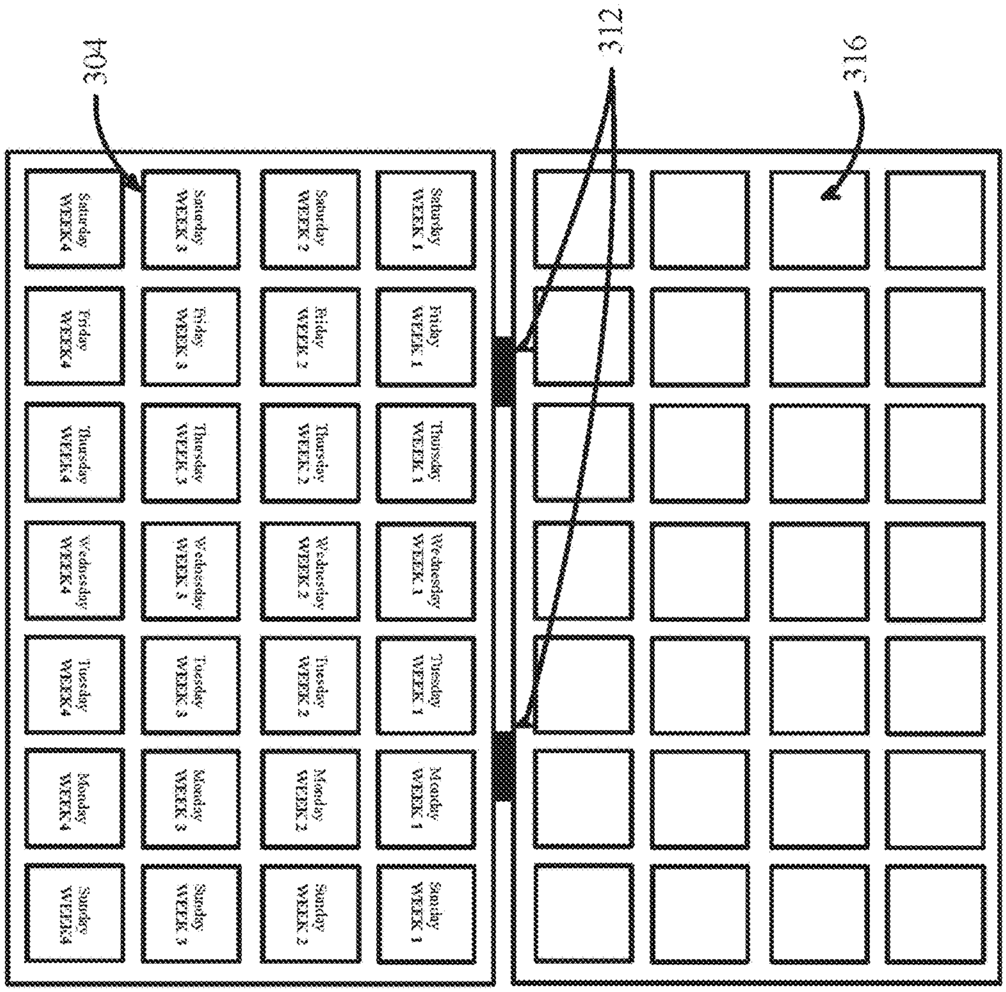
FIG. 3B is an illustration of an open view exemplary embodiment of a hinged monthly pill planner.
Figure 3C:
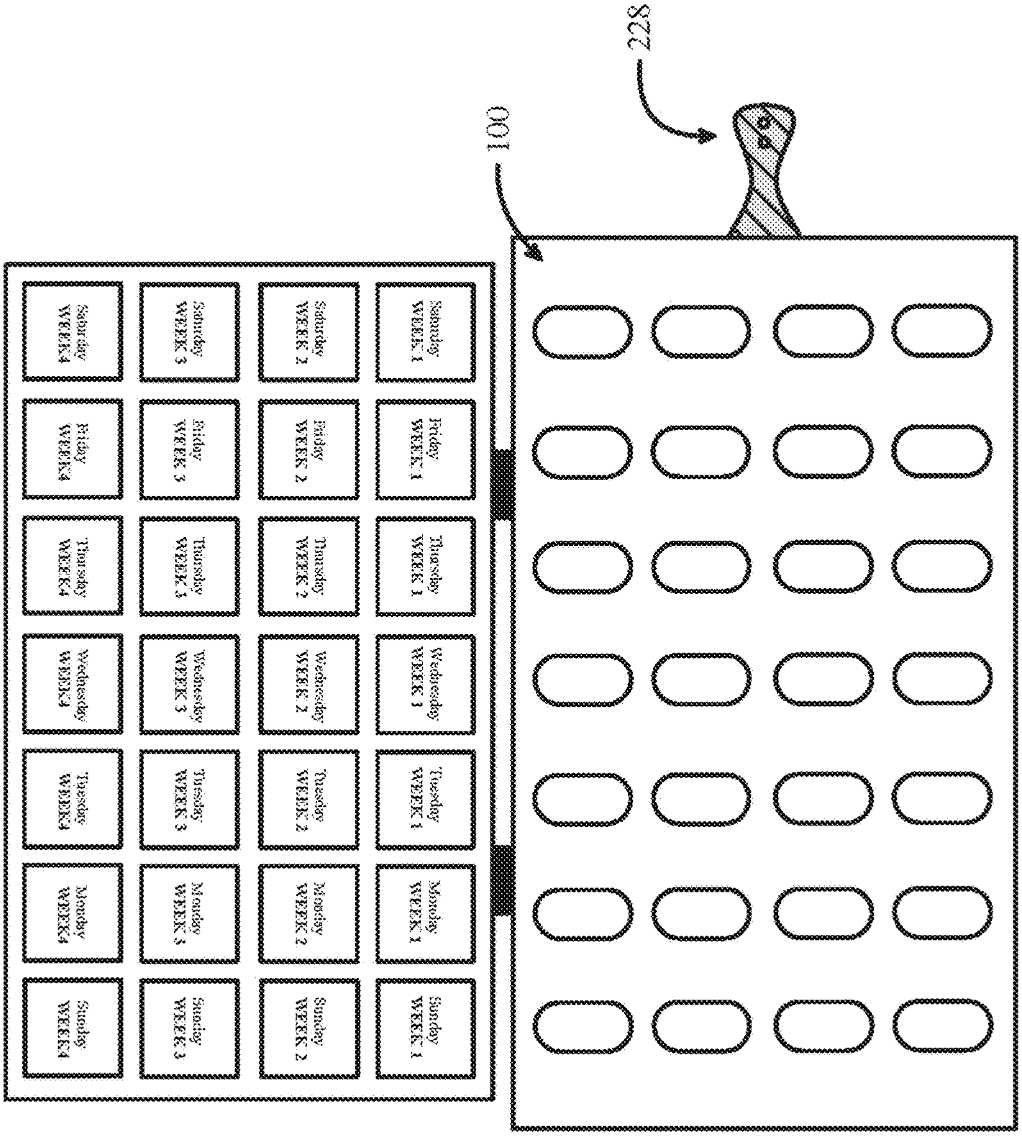
FIG. 3C is an illustration of an exemplary embodiment of a device used on a hinged pill planner.

Referring now to FIG. 3A-E, an example of device 100 applied to other pill boxes is illustrated; FIGS. 3A-B illustrate an exemplary embodiment of a closed top-view of a pill planner box 304. The pill planner box 304 may include labels 308. For examples, labels may include, without limitation, labels listing dates, times of day, medication names, dosages, and patient names. Labels 308 may also extend to listing categories such as vitamin types, nutritional supplements, over-the-counter medications, and/or non-pharmaceutical items that require sorting like beads for crafting, screws or small hardware for electronics, seeds for gardening, or any other small items that benefit from organized compartmentalization. Labels 308 may be pre-printed, handwritten, or even use electronic displays for customization according to specific sorting needs of a user. Pill planner box 304 may include a connector such as a hinge 312 connecting to storage box 316 of the pill planner box 304. As used in this disclosure, a "hinge" is a mechanism that allows for the movement between two rigid objects such as a lid and base of pill planner box 304, for instance permitting selective closure, thereof while facilitating easy access to the contents. Hinge 312 may be a traditional metal hinge that provides a sturdy connection between the top and bottom parts of the box with a fixed axis of rotation. Alternatively, hinge 312 may be a component composed of a flexible material and/or combination of materials, such as a strip of silicone or rubber, which allows the top to be easily folded back. In some embodiments, the hinge may be magnetic, enabling a secure closure without the need for a physical interlocking mechanism. Magnetic hinges may allow for a seamless look and easy opening without the need for latches or clasps. Another possible design could involve a living hinge made from a durable plastic that is integral to the pill planner box, providing a low-cost solution with fewer parts. Materials of hinge 312 may include, but are not limited to, metals such as stainless steel for strength and corrosion resistance, plastics such as polypropylene for flexibility and chemical resistance, or composites for a balance of strength and weight. For user convenience, hinge 312 may also be a snap-fit or a press-fit type that allows the user to easily detach and reattach the top and bottom parts of the box for cleaning or refilling purposes. This type of hinge may be especially useful for items that need frequent washing or where the ability to separate the components quickly is beneficial. As a non-limiting example, hinge 312 on pill planner box 304 may consist of a pair of interlocking pieces that click together, one attached to the lid and one to the base, making assembly and disassembly straightforward without the need for tools.

Figure 3D:
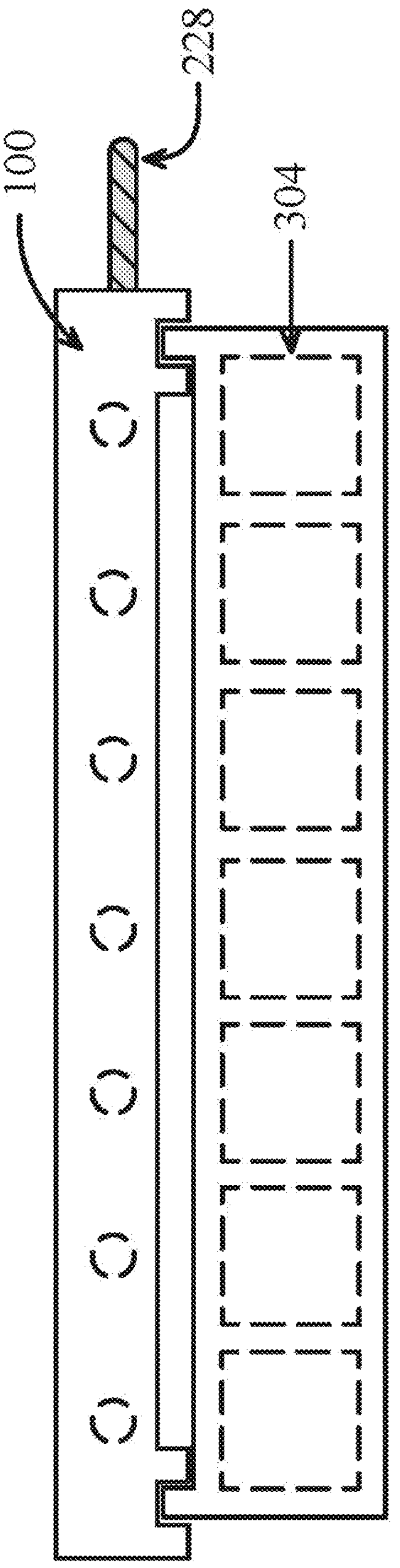
FIG. 3D is an illustration of a side view exemplary embodiment of a device placed on top of a hinged pill planner with a recess.
Figure 3E:
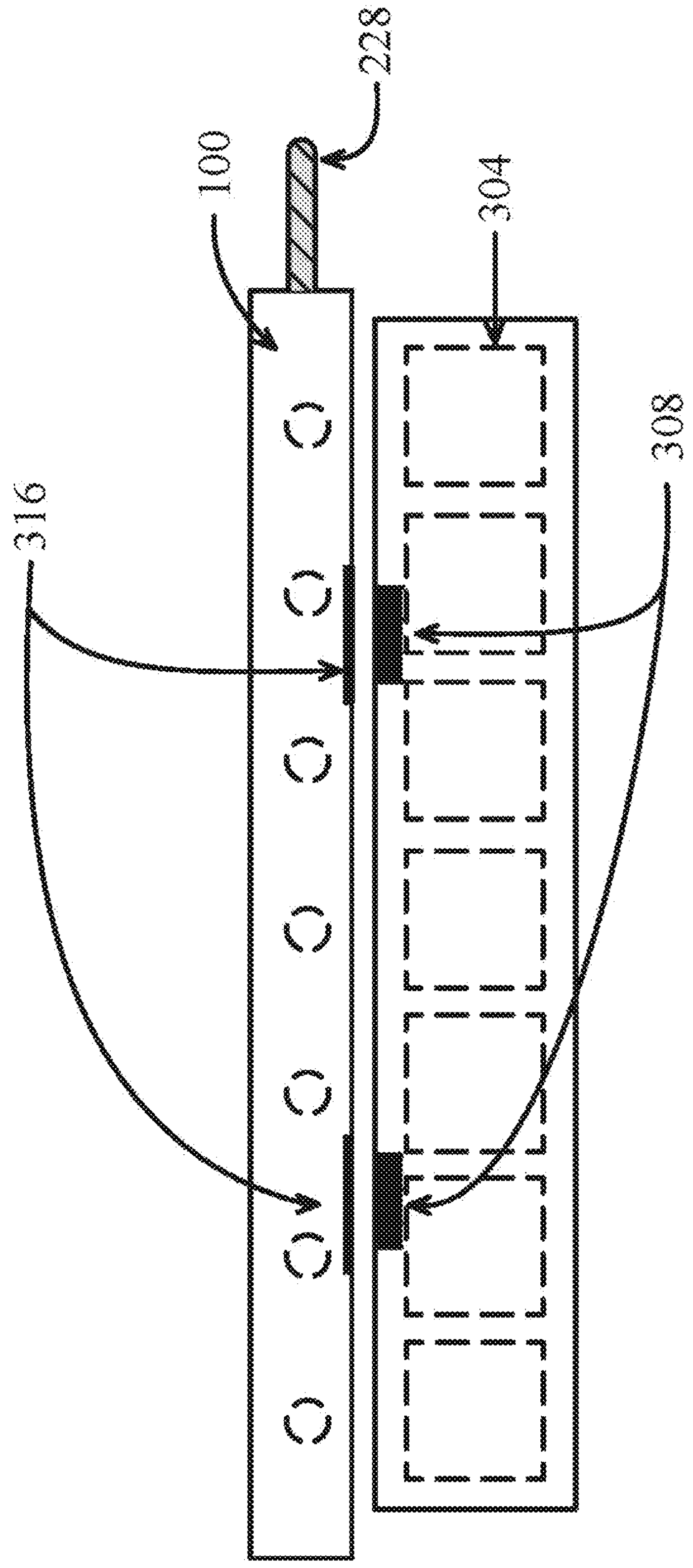
FIG. 3E is an illustration of a side view exemplary embodiment of a device place on top of a hinged pill planner with a metallic component.
Figure 3F:
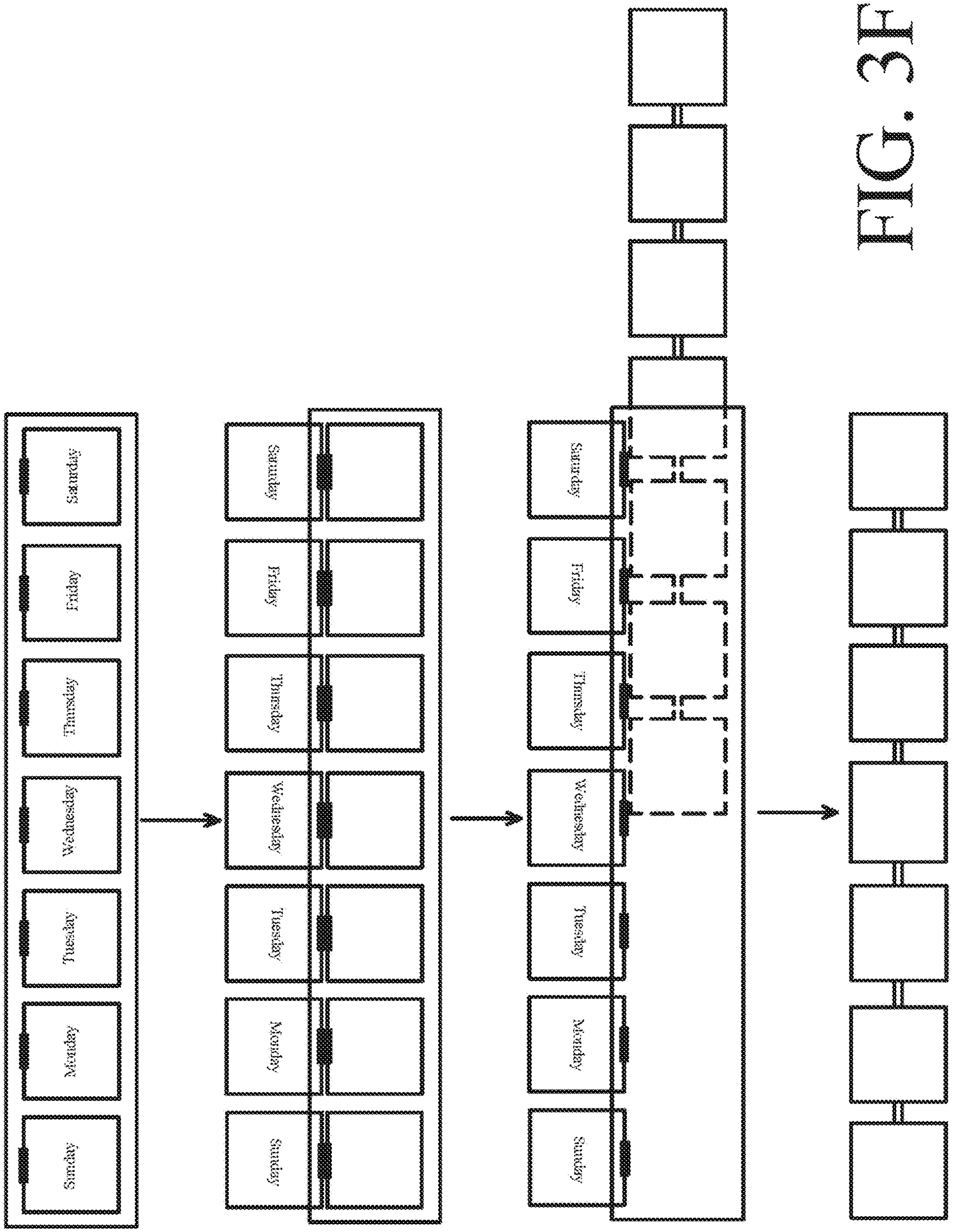
FIG. 3F is an illustration of an exemplary embodiment of a hinged weekly pill planner.

Still referring to FIG. 3A-E, FIG. 3C illustrates an exemplary embodiment of device 100 used on a hinged pill planner box 304. In a non-limiting example, once pill planner box 304 is opened via hinge 312, device 100 may be able to be placed on top of open storage box 316. Device 100 may be aligned such that it rests securely on the edges or a designated mounting area of storage box 316; for instance, a projecting lip with raised edges that extend slightly outward from the sides of device 100; magnetic strips embedded along the side of device 100 that align with metallic components on storage box 216, device 100 may snaps into place and remains stable during use; non-slip rubber strips along the bottom edges of device 100 to increase friction and prevent sliding on smooth surfaces, or other element may. FIGS. 3D-E illustrate a side view example of two mechanism used to connect device 100 with pill planner box 316. If hinge 312 is constructed of metal, which corresponding side of device 100 may also include a metal or metallic components 316, allowing for a synergistic magnetic connection. The magnetic hinging action may be facilitated by designing hinge 312 with an integrated protruding arm or flange. Device 100 may also feature a protruding arm or flange that may be engineered to engage with a counterpart on the pill planner box 304. Pill planner box 304 may be a recess, a matching flange, or a hinge counterpart with device 100's arm or flange slots into or attaches to facilitate a secure and pivotal connection. Hinge design may ensure device 100 remains aligned with the individual compartments of storage box 316, allowing for the precise dispensation of medication pills into the designated slots. As a result, users can sort their medication pills into the appropriate sections with confidence, knowing that the alignment will be maintained throughout the process. This methodical process ensures that pills are sorted accurately and efficiently, enhancing the overall functionality and user experience of the pill management system.

With continued reference to FIG. 3A-E, FIG. 3F illustrate an exemplary embodiment of device 100 used in conjunction with hinged monthly pill planner box 304. Pill planner box 304 may include monthly, weekly, but not limited to other desired plan. In a non-limiting example, weekly pill planner box may feature seven individual compartments, each with its own flip-top, corresponding to the days of the week. The design of the pill planner box 304 is such that it complements the use of device 100, ensuring a streamlined process for the user. When it's time to sort pills, user may open the hinged lid of the weekly pill planner box 304 to reveal the tray of compartments. Each compartment may be part of a single tray that is designed to slide out or be removed entirely from the main body of the pill planner box 304. The single tray may be positioned directly underneath device 100, may allow for the sorted pills to be dispensed easily into the appropriate compartment for each day of the week. The structural design of the weekly pill planner box 304 may include features that align with device 100, such as notches, guides, or rails that facilitate the smooth placement and secure attachment of the tray under device 100. Once in place, user may operate device 100 to sort medication pills directly into each compartments. After the sorting is complete, the tray may be slid back into pill planner box 304, and the flip-tops may be closed to secure the pills in each compartment. In this way, the weekly pill planner box and device 100 work in tandem to simplify the process of organizing medication by days of the week. Device 100 may be used efficiently to distribute pills into a planner box that aids users in managing their weekly medication schedule.

Figure 4:
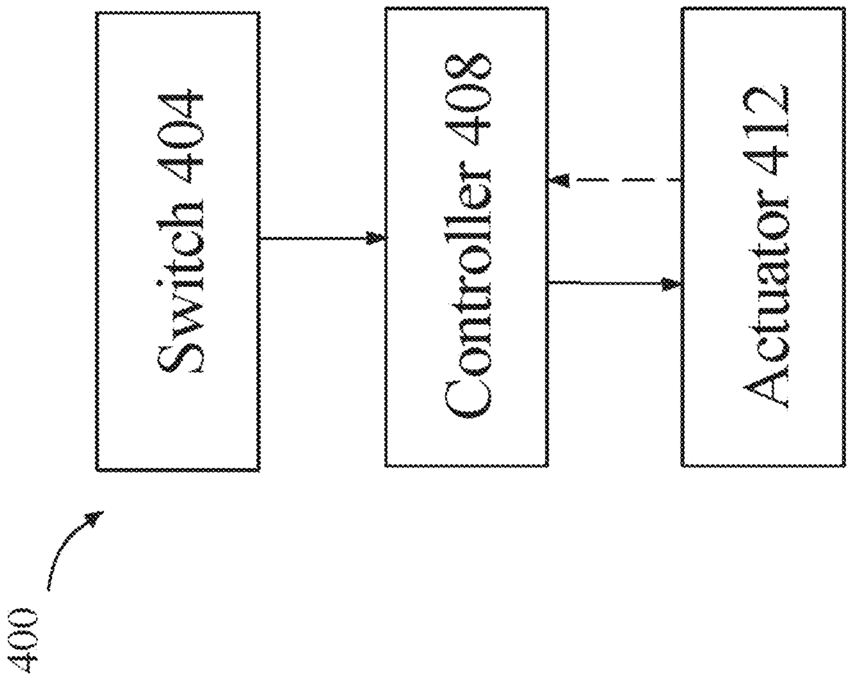
FIG. 4 is a block diagram of communication system including an example of a workflow that may be used with such a system according to an embodiment of the invention.

Referring now to FIG. 4, a block diagram of a communication system 400 illustrating an example of a workflow that may be used with such a system according to an embodiment of the invention. The first block represents a witch 404, which may be the primary user interface for the system. Switch may include a button, a rocker, a rotary switch, a push button switch, a slider, a toggle switch, a plunger, and the like. A switch may include a solid mechanical format or touch-screen format. In some embodiments, a switch may include a capacitive button. When the switch is operated by the user, an input signal may be generated. This signal may represent the user's command or request for the system to perform a specific action, such as starting a process, stopping a process, changing a setting, or any other user-specified command.

With continuing reference to FIG. 4, the input signal from the switch may be transmitted to a controller 408. The controller may be a computing device or a component designed to process the input signal from the switch or button. Controller 408 may include any computing device as described in this disclosure, including without limitation a microcontroller, microprocessor, digital signal processor (DSP) and/or system on a chip (SoC) as described in this disclosure. Controller 408 may include, be included in, and/or communicate with a mobile device such as a mobile telephone or smartphone. Controller 408 may include a single computing device operating independently, or may include two or more computing device operating in concert, in parallel, sequentially or the like; two or more computing devices may be included together in a single computing device or in two or more computing devices. Controller 408 may interface or communicate with one or more additional devices as described below in further detail via a network interface device. Network interface device may be utilized for connecting controller 408 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Controller 408 may include but is not limited to, for example, a computing device or cluster of computing devices in a first location and a second computing device or cluster of computing devices in a second location. Controller 408 may include one or more computing devices dedicated to data storage, security, distribution of traffic for load balancing, and the like. Controller 408 may distribute one or more computing tasks as described below across a plurality of computing devices of computing device, which may operate in parallel, in series, redundantly, or in any other manner used for distribution of tasks or memory between computing devices. Controller 408 may be implemented, as a non-limiting example, using a "shared nothing" architecture.

With continued reference to FIG. 4, controller 408 may be designed and/or configured to perform any method, method step, or sequence of method steps in any embodiment described in this disclosure, in any order and with any degree of repetition. For instance, Controller 408 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Controller 408 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 4, upon receiving the signal, the controller may interpret the user's command and translate it into a suitable format that may be understood and executed by the system's actuator. The controller may also have the ability to send multiple commands to the actuator depending on the complexity of the operation required by the user's command.

Still referring to FIG. 4, the processed command from the controller may be sent to the actuator. The actuator may be a mechanical or an electronic device that may physically perform the user's command as interpreted and translated by the controller. The actuator may respond by changing its state or performing a certain action, such as moving a part of the system, turning on a light, or any other action that is within the capability of the actuator. Upon the successful completion of the action, the actuator may send a feedback signal back to the controller, informing it about the current state of the actuator or the results of the executed command. In some embodiments, actuator may replace or supplement the functionality of actuator 224, described with respect to FIGS. 2A and 2B.

With continued reference to FIGS. 4, an actuator 412 may include a component of a machine that is responsible for moving and/or controlling a mechanism or system. An actuator 412 may, in some cases, require a control signal and/or a source of energy or power. In some cases, a control signal may be relatively low energy. Exemplary control signal forms include electric potential or current, pneumatic pressure or flow, or hydraulic fluid pressure or flow, mechanical force/torque or velocity, or even human power. In some cases, an actuator may have an energy or power source other than control signal. This may include a main energy source, which may include for example electric power, hydraulic power, pneumatic power, mechanical power, and the like. In some cases, upon receiving a control signal, an actuator 412 responds by converting source power into mechanical motion. In some cases, an actuator 412 may be understood as a form of automation or automatic control.

With continued reference to FIG. 4, in some embodiments, actuator 412 may include a hydraulic actuator. A hydraulic actuator may consist of a cylinder or fluid motor that uses hydraulic power to facilitate mechanical operation. Output of hydraulic actuator 412 may include mechanical motion, such as without limitation linear, rotatory, or oscillatory motion. In some cases, hydraulic actuator may employ a liquid hydraulic fluid. As liquids, in some cases. are incompressible, a hydraulic actuator can exert large forces. Additionally, as force is equal to pressure multiplied by area, hydraulic actuators may act as force transformers with changes in area (e.g., cross sectional area of cylinder and/or piston). An exemplary hydraulic cylinder may consist of a hollow cylindrical tube within which a piston can slide. In some cases, a hydraulic cylinder may be considered single acting. Single acting may be used when fluid pressure is applied substantially to just one side of a piston. Consequently, a single acting piston can move in only one direction. In some cases, a spring may be used to give a single acting piston a return stroke. In some cases, a hydraulic cylinder may be double acting. Double acting may be used when pressure is applied substantially on each side of a piston; any difference in resultant force between the two sides of the piston causes the piston to move.

With continued reference to FIG. 4, in some embodiments, actuator 412 may include a pneumatic actuator. In some cases, a pneumatic actuator may enable considerable forces to be produced from relatively small changes in gas pressure. In some cases, a pneumatic actuator May respond more quickly than other types of actuators, for example hydraulic actuators. A pneumatic actuator may use compressible fluid (e.g., air). In some cases, a pneumatic actuator may operate on compressed air. Operation of hydraulic and/or pneumatic actuators may include control of one or more valves, circuits, fluid pumps, and/or fluid manifolds.

With continued reference to FIG. 4, in some cases, actuator 412 may include an electric actuator. Electric actuator may include any of electromechanical actuators, linear motors, and the like. In some cases, actuator 228*a-b* may include an electromechanical actuator. An electromechanical actuator may convert a rotational force of an electric rotary motor into a linear movement to generate a linear movement through a mechanism. Exemplary mechanisms, include rotational to translational motion transformers, such as without limitation a belt, a screw, a crank, a cam, a linkage, a scotch yoke, a rack and pinion gear, and the like. In some cases, control of an electromechanical actuator may include control of electric motor, for instance a control signal may control one or more electric motor parameters to control electromechanical actuator. Exemplary non-limitation electric motor parameters include rotational position, input torque, velocity, current, and potential. Electric actuator may include a linear motor. Linear motors may differ from electromechanical actuators, as power from linear motors is output directly as translational motion, rather than output as rotational motion and converted to translational motion. In some cases, a linear motor may cause lower friction losses than other devices. Linear motors may be further specified into at least 3 different categories, including flat linear motor, U-channel linear motors and tubular linear motors. Linear motors 228*a-b* may be controlled directly controlled by a control signal for controlling one or more linear motor parameters. Exemplary linear motor parameters include without limitation position, force, velocity, potential, and current.

With continued reference to FIG. 4, in some embodiments, an actuator 412 may include a mechanical actuator. In some cases, a mechanical actuator may function to execute movement by converting one kind of motion, such as rotary motion, into another kind, such as linear motion. An exemplary mechanical actuator includes a rack and pinion. In some cases, a mechanical power source, such as a power take off may serve as power source for a mechanical actuator. Mechanical actuators may employ any number of mechanism, including for example without limitation gears, rails, pulleys, cables, linkages, and the like.

Further referring to FIG. 4, controller 408 may be configured to generate an activation signal to be transmitted to an actuator. Controller 408 may have multiple modes, such as without limitation a manual mode in which controller 408 sends signals to an actuator upon receiving a user input and/or command to do so, and an automatic mode in which controller 408 determines when to send the activation signal automatically. In some embodiments, controller 408 may direct an actuator to run continuously or periodically; for instance, where controller is a microcontroller or the like, controller may send a continuous "on" signal to an actuator or may repeatedly command actuator to move alternately in forward and reverse, such that the actuator is more or less continually in motion. Alternatively or additionally, controller 408 may command actuator to cycle device once per a period of time, which may be measured in seconds, milliseconds, or the like; controller 408 may compare a running timer and/or counter that counts clock cycles to period and transmit signal upon detecting that period has elapsed. Period may be preset or may be set by a user, for instance to be approximately the amount of time it takes to deposit a pill at each well; as an example, user may determine that it takes user 5 seconds to deposit a pill at each well and may program controller 408 to transmit a signal to cycle device every 6 seconds. Alternatively or additionally, controller 408 may record user activations and/or commands to drive actuator when in a manual mode, calculate an average time between such demands, and then set period to automatically transmit the activation signal after a period equal to, approximately equal to, slightly larger than, or otherwise based on the average, or on any other statistical measure of time between manual activations.

Alternatively or additionally, and still referring to FIG. 4, controller 408 may determine when to send an activation signal based on an input from at least a sensor 316. Sensor 316 may include, without limitation, one or more load cells which may be located, in a non-limiting example, beneath one or more or receptacles; a "load cell" as used in this disclosure is an electronic sensor 316 that detects an amount of force or pressure exerted on a surface thereof and transmits an electrical signal indicating the amount of force or pressure. A load cell may function, without limitation, as a "scale" or a similar apparatus. In some embodiments, there may be a single load cell beneath a set of receptacles, which may measure a mass or weight of the set of receptacles device, and any quantity of pills therein or thereon; measured weight may be compared to a calibrated or tared weight of receptacles and/or device prior to addition of pills. In some embodiments, an increase in weight of receptacles, device, and pills may be detected using load cells and compared by controller 408 to an expected and/or estimated weight of a course of pills to be distributed between wells. Expected value may be calculated by controller 408, without limitation, by receiving from a user or storing an input describing a type, brand, and/or product of and/or associated with pill; this may include a weight and/or mass per pill, a number of pills per does, or the like. In certain embodiments, controller 408 may utilize weight data gathered from load cells to ascertain the presence of the correct weight of the pills and also to confirm the completion of the pill distribution process. Upon dispensing, controller 408 may measure the incremental increase in weight in each receptacle as pills are added. By comparing this real-time data against the expected weight for a full course of pills-calculated based on the known weight per pill and the prescribed dosage-controller 408 may determine when the correct quantity has been dispensed. Controller 408 may compare a detected increase in weight to an increase expected upon placing a course of pills of a given type stored in data, per instructions in a prescription or the like, and upon detection that the weight has increased in amount approximately equal to, exceeding, and/or within probabilistically determined range about expected increase, may transmit a signal to actuator to cycle device. For example, if a specific medication has a known weight of 0.5 grams per pill and the prescribed dosage is two pills, controller 408 would anticipate an increase of 1 gram per well. As pills are distributed, controller may monitor the weight of each well in real-time. When load cell beneath a well registers an increase of 1 gram, the controller can infer that two pills have been successfully dispensed into that well.

Further referring to FIG. 2, at least a load cell may include a plurality of load cells, such as two or four load cells under the set of receptacles and device and/or a load cell per receptacle. Controller 408 may compare weights recorded at each load cell to each other load cell and determine differences, rations, and/or other relationships between such values. Controller 408 may use relationships to detect a distribution of mass of pills; distribution may be compared to an expected distribution to determine, for instance, whether pills are distributed evenly between wells and/or are distributed correctly according to a schedule established by a prescription.

Continuing to refer to FIG. 4, controller 408 may detect one or more error conditions, such as incorrectly distributed pills, pills in excess of a quantity prescribed, fewer pills than prescribed, pills that have been placed into the wrong well and/or receptacle, or the like. This may be performed, without limitation, upon detection of excess or unevenness, and/or after distribution to wells for a given cycle has completed, such as when a period has elapsed and/or when a user has entered a signal indicating that user has finished distributing pills. Controller 408 may output an error message at a display, using an audio output device such as a speaker or buzzer, using one or more lights, or the like.

Figure 5:
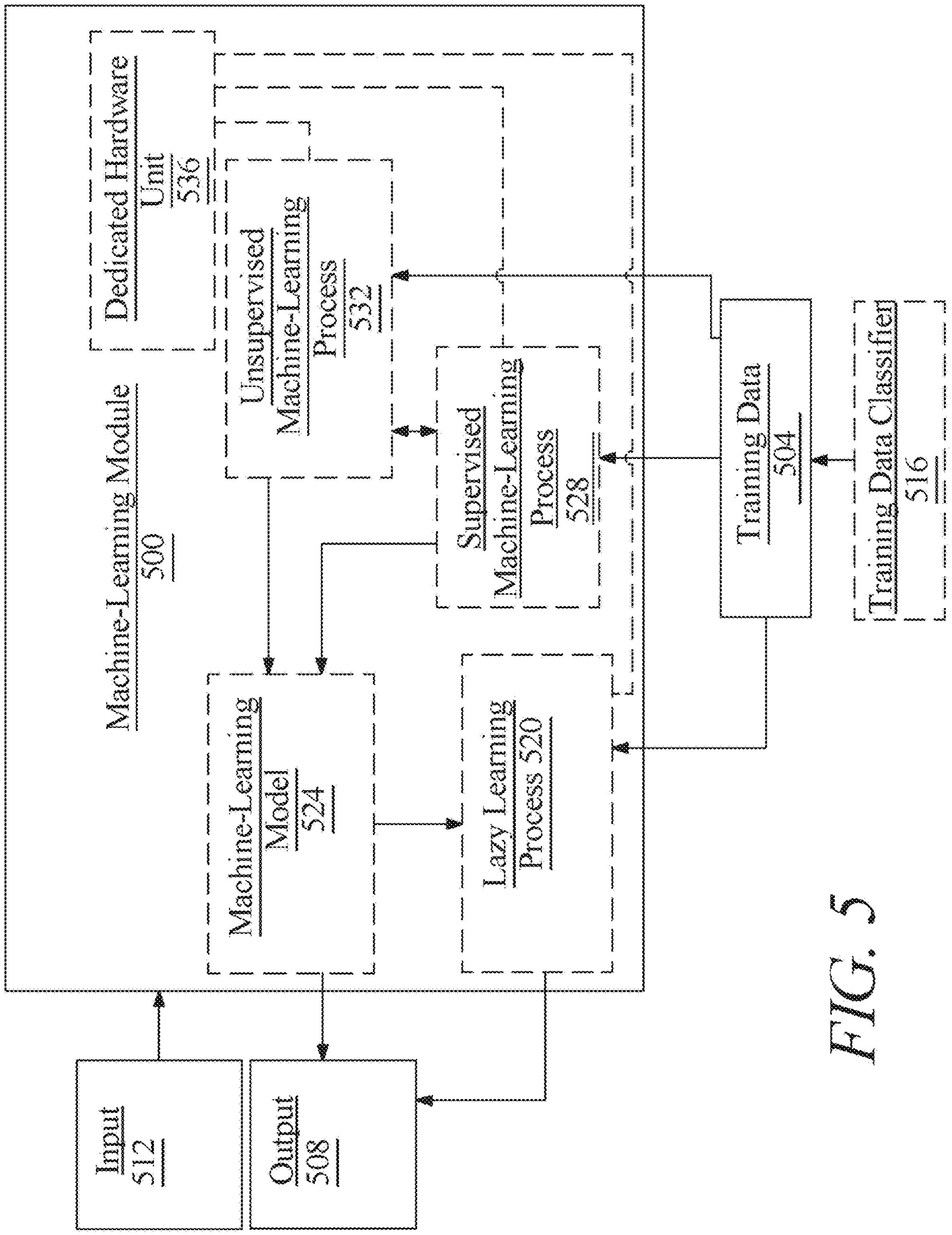
FIG. 5 is a block diagram of an exemplary machine-learning process.

Referring now to FIG. 5, an exemplary embodiment of a machine-learning module 500 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 504 to generate an algorithm instantiated in hardware or software logic, data structures, and/or functions that will be performed by a computing device/module to produce outputs 508 given data provided as inputs 512; this is in contrast to a non-machine learning software program where the commands to be executed are determined in advance by a user and written in a programming language.

Still referring to FIG. 5, "training data," as used herein, is data containing correlations that a machine-learning process may use to model relationships between two or more categories of data elements. For instance, and without limitation, training data 504 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 504 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 504 according to various correlations; correlations may indicate causative and/or predictive links between categories of data elements, which may be modeled as relationships such as mathematical relationships by machine-learning processes as described in further detail below. Training data 504 may be formatted and/or organized by categories of data elements, for instance by associating data elements with one or more descriptors corresponding to categories of data elements. As a non-limiting example, training data 504 may include data entered in standardized forms by persons or processes, such that entry of a given data element in a given field in a form may be mapped to one or more descriptors of categories. Elements in training data 504 may be linked to descriptors of categories by tags, tokens, or other data elements; for instance, and without limitation, training data 504 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 5, training data 504 may include one or more elements that are not categorized; that is, training data 504 may not be formatted or contain descriptors for some elements of data. Machine-learning algorithms and/or other processes may sort training data 504 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 504 to be made applicable for two or more distinct machine-learning algorithms as described in further detail below. Training data 504 used by machine-learning module 500 may correlate any input data as described in this disclosure to any output data as described in this disclosure. As a non-limiting illustrative example, the input data for training data 504 may include physical characteristics of pills, such as, size, shape, color, texture, and weight. For, output data, machine-learning module 500 might be trained to predict and output pill sorting parameters. Which pill goes into which compartment based on the date and time of administration.

Further referring to FIG. 5, training data may be filtered, sorted, and/or selected using one or more supervised and/or unsupervised machine-learning processes and/or models as described in further detail below; such models may include without limitation a training data classifier 516. Training data classifier 516 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 500 may generate a classifier using a classification algorithm, defined as a processes whereby a computing device and/or any module and/or component operating thereon derives a classifier from training data 504. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 516 may classify elements of training data to identify and categorize specific sub-populations, such as cohorts of patients with similar medication regimens or those who share common characteristics that could influence medication management, like age groups, underlying health conditions, or even lifestyle factors that may affect medication adherence. For instance, within the context of a pill planner system, training data 504 could be filtered to focus on elderly patients who take multiple medications daily. This sub-population may have unique needs, such as larger pill compartments or more frequent dosage times. By training the machine learning models specifically on data from this group, the resulting algorithm could better tailor the sorting and notification features of the pill planner to address the challenges faced by elderly users. Another example might be filtering the training data to concentrate on patients with chronic conditions like hypertension or diabetes. These patients often have strict medication schedules and might benefit from more nuanced machine learning models that can predict and adjust to their dynamic needs, such as changes in medication types or dosages over time.

Still referring to FIG. 5, computing device 504 may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A)\ P(A)\div P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device 504 may then calculate a likelihood table by calculating probabilities of different data entries and classification labels. Computing device 504 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 5, computing device 504 may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input) data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 5, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm: $l=\sqrt{\sum_{i=0}^{n} a_i^2}$, where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 5, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 5, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 5, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 5, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 5, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 5, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 5, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 5, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max}\colon X_{new} = \frac{X - X_{min}}{X_{max} - X_{in}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation $\sigma$ of a set or subset of values:

$$X_{new} = \frac{X - X_{mean}}{\sigma}.$$

Scaling may be performed using a median value of a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Further referring to FIG. 5, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

Still referring to FIG. 5, machine-learning module 500 may be configured to perform a lazy-learning process 520 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 504. Heuristic may include selecting some number of highest-ranking associations and/or training data 504 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 5, machine-learning processes as described in this disclosure may be used to generate machine-learning models 524. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 524 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 524 may be generated by creating an artificial neural network, such as a convolutional neural network comprising an input layer of nodes, one or more intermediate layers, and an output layer of nodes. Connections between nodes may be created via the process of "training" the network, in which elements from a training data 504 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 5, machine-learning algorithms may include at least a supervised machine-learning process 528. At least a supervised machine-learning process 528, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include inputs as described in this disclosure as inputs, outputs as described in this disclosure as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 504. Persons skilled in the art, upon reviewing the entirety of this disclosure, will be aware of various possible variations of at least a supervised machine-learning process 528 that may be used to determine relation between inputs and outputs. Supervised machine-learning processes may include classification algorithms as defined above.

With further reference to FIG. 5, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 5, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 5, machine learning processes may include at least an unsupervised machine-learning processes 532. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 532 may not require a response variable; unsupervised processes 532 may be used to find interesting patterns and/or inferences between variables, to determine a degree of correlation between two or more variables, or the like.

Still referring to FIG. 5, machine-learning module 500 may be designed and configured to create a machine-learning model 524 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 5, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 5, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 5, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 5, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 5, one or more processes or algorithms described above may be performed by at least a dedicated hardware unit 536. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 536 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 536 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 536 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 6:
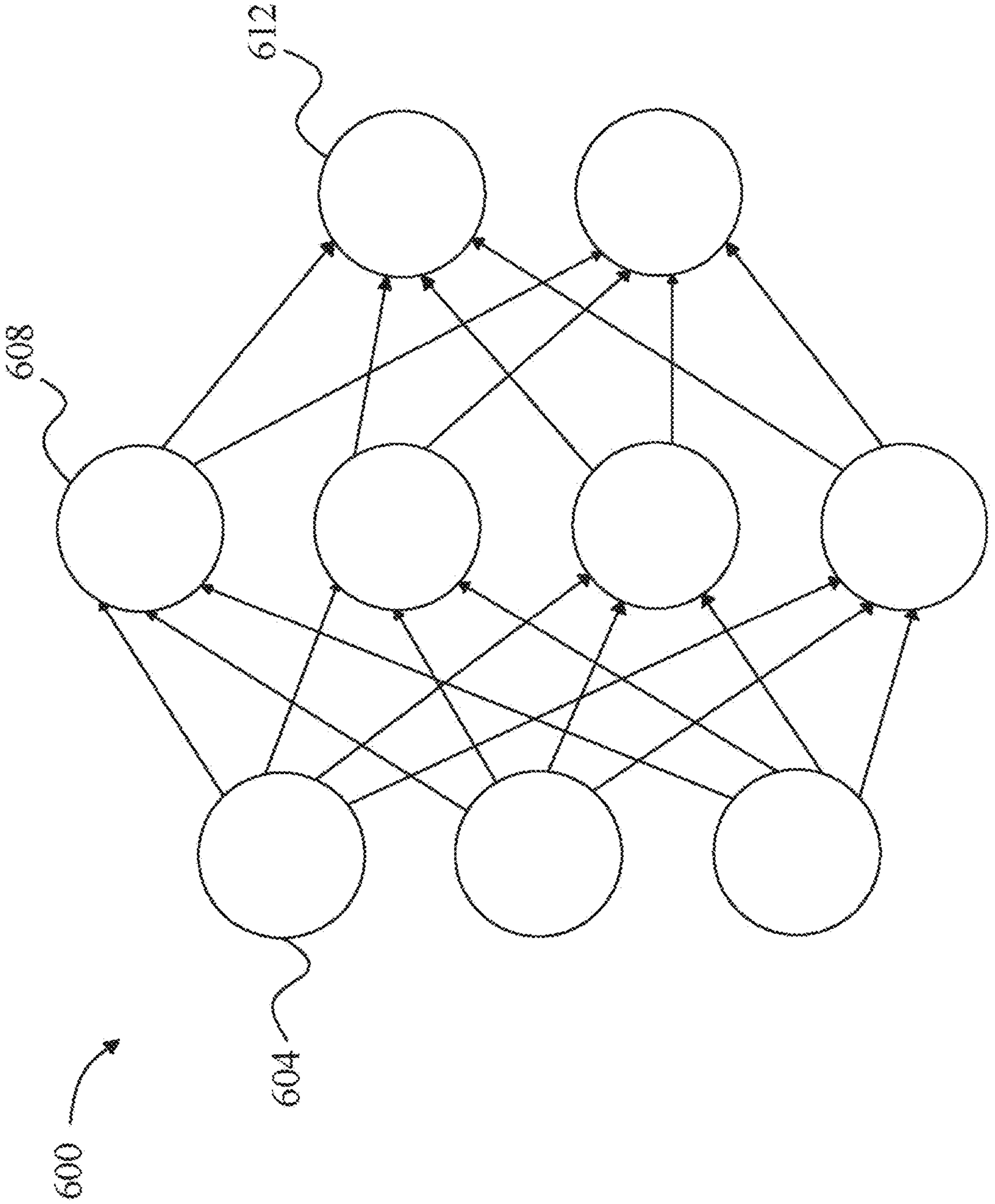
FIG. 6 is a diagram of an exemplary embodiment of neural network.

Referring now to FIG. 6, an exemplary embodiment of neural network 600 is illustrated. A neural network 600 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 604, one or more intermediate layers 608, and an output layer of nodes 612. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 7:
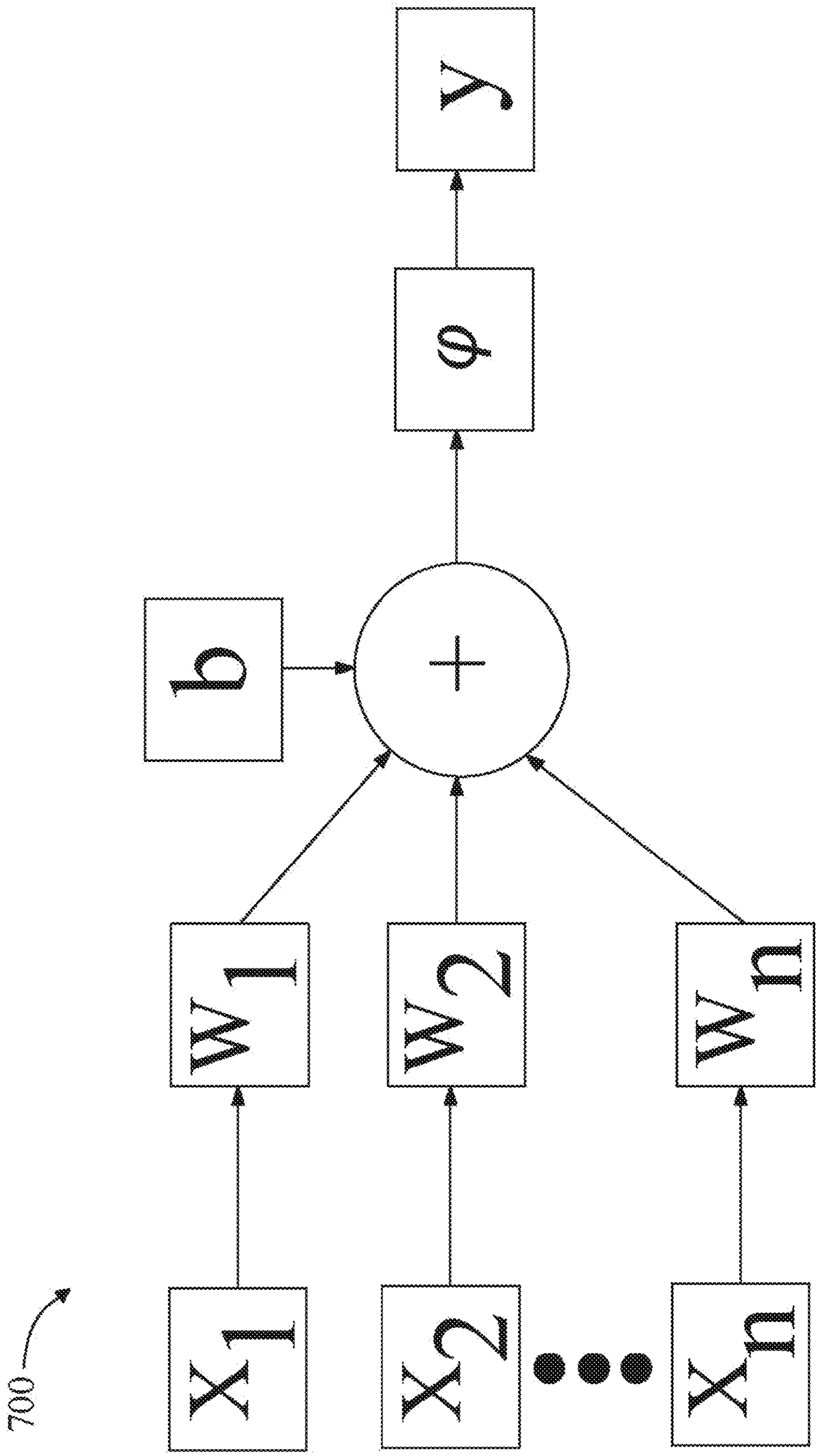
FIG. 7 is a diagram of an exemplary embodiment of a node of a neural network.

Referring now to FIG. 7, an exemplary embodiment of a node 700 of a neural network is illustrated. A node may include, without limitation, a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic. 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0, x)$, a "leaky" and/or "parametric" rectified linear unit function such as $f(x)=\max(ax, x)$ for some a, an exponential linear units function such as $$f(x) = \begin{cases} x \text{ for } x \geq 0 \\ \alpha(e^x - 1) \text{ for } x < 0 \end{cases}$$

for some value of α (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $f(x)=a(1+\tanh(\sqrt{2/\pi}(x+bx^r)))$ for some values of a, b, and r, and/or a scaled exponential linear unit function such as $$f(x) = \lambda \begin{cases} \alpha(e^x - 1) \text{ for } x < 0 \\ x \text{ for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 8:
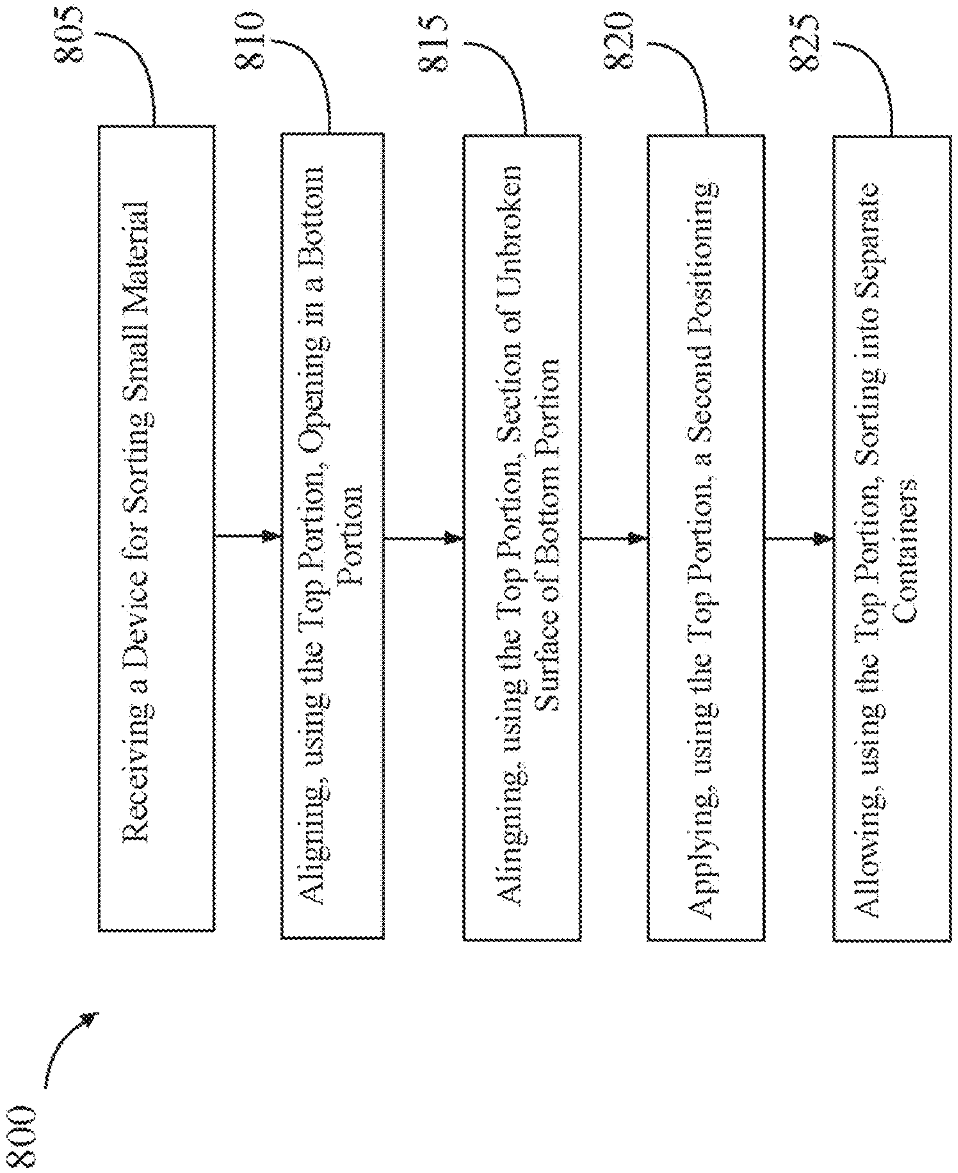
FIG. 8 is a flow diagram illustrating an exemplary workflow in one embodiment of the present invention.

Referring now to FIG. 8, a flow diagram of an exemplary method 800 for sorting small pieces of material into separate containers is illustrated. Method 800 includes a step at 805 of receiving a device for sorting small pieces of material, wherein the device comprises a top portion comprising two lateral troughs each with a bottom surface, at least a well in the bottom surface, and at least a through opening in the bottom of the at least a well, wherein the bottom surface comprises a substantially planar surface with a plurality of openings, wherein each opening of the plurality of openings in the bottom portion is aligned to correspond with an opening of the at least one through opening in the two lateral troughs. This may be implemented, without limitation, as described above with reference to FIGS. 1-7.

With continued reference to FIG. 8, method 800 includes a step 810 of aligning, using the top portion, each opening of the plurality of openings in the bottom portion to correspond with an opening of the at least a through opening of the two lateral troughs. This may be implemented, without limitation, as described above with reference to FIGS. 1-7.

With continued reference to FIG. 4, method 800 includes a step 815 of aligning, using the top portion, the plurality of sections of unbroken surface of the bottom portion to correspond with each through opening of the at least a through opening of the two-lateral trough. This may be implemented, without limitation, as described above with reference to FIGS. 1-7.

Still referring to FIG. 8, method 800 includes a step 820 of applying, using the top portion, a second positioning of the top portion relative to the bottom portion, where the top portion and bottom portion slide between a first position where the plurality of sections of unbroken surface are positioned beneath the at least a through opening, and a second position wherein the plurality of openings are positioned beneath the at least a through opening, at a subsequent time. This may be implemented, without limitation, as described above with reference to FIGS. 1-7.

With continued reference to FIG. 8, method 800 includes a step 825 of allowing, when in the second position, the small pieces of material to pass through the at least a through opening of the two-lateral trough, thereby sorting the material into separate containers. This may be implemented, without limitation, as described above with reference to FIGS. 1-7.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 9:
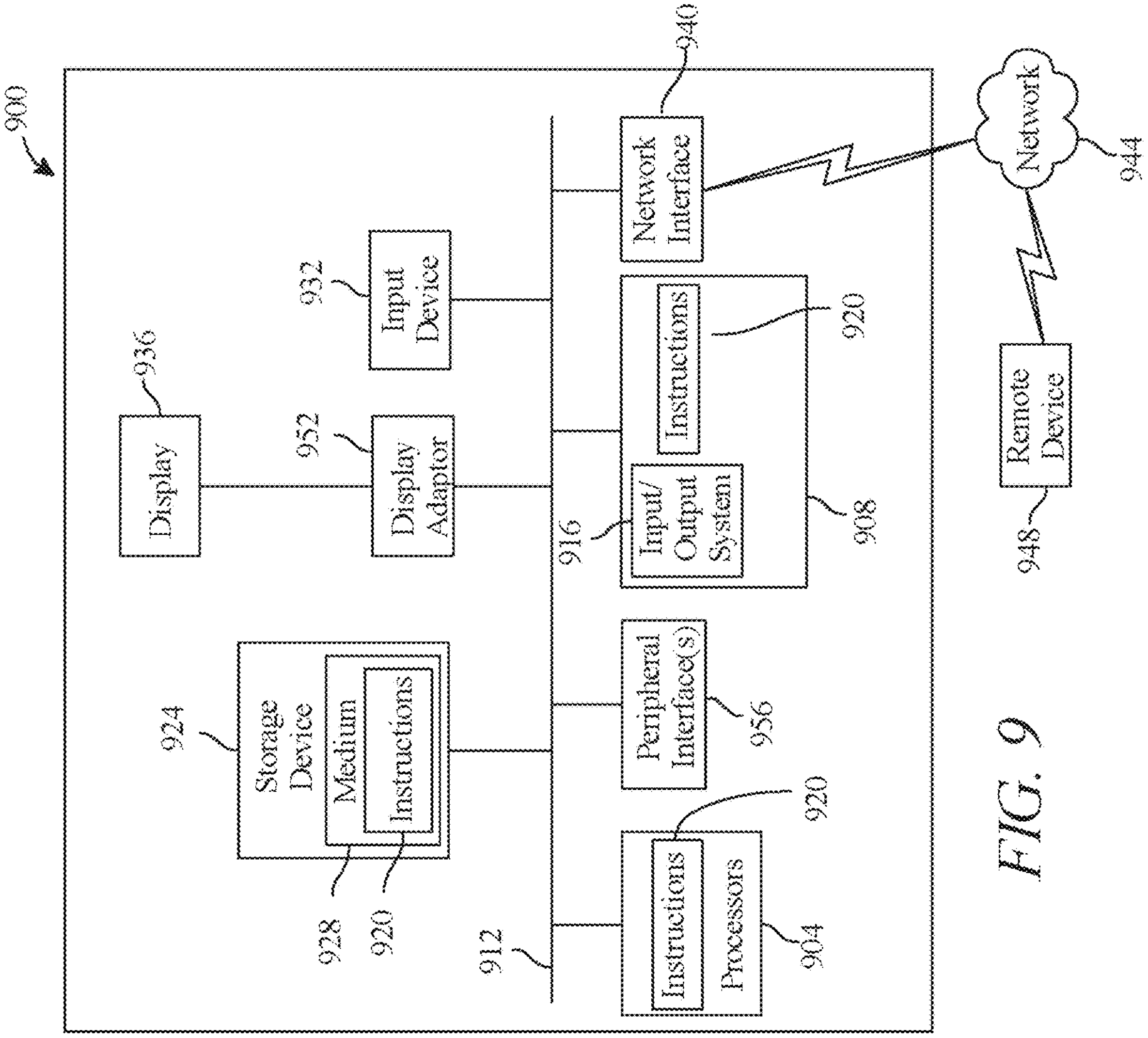
FIG. 9 is a block diagram of a computing system that can be used to implement any one or more of the methodologies disclosed herein and any one or more portions thereof.

FIG. 9 shows a diagrammatic representation of one embodiment of a computing device in the exemplary form of a computer system 900 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 900 includes a processor 904 and a memory 908 that communicate with each other, and with other components, via a bus 912. Bus 912 may include any of several types of bus structures including, but not limited to, a memory bus, a memory controller, a peripheral bus, a local bus, and any combinations thereof, using any of a variety of bus architectures.

Processor 904 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 904 may be organized according to Von Neumann and/or Harvard architecture as a non-limiting example. Processor 904 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 908 may include various components (e.g., machine-readable media) including, but not limited to, a random-access memory component, a read only component, and any combinations thereof. In one example, a basic input/output system 916 (BIOS), including basic routines that help to transfer information between elements within computer system 900, such as during start-up, may be stored in memory 908. Memory 908 may also include (e.g., stored on one or more machine-readable media) instructions (e.g., software) 920 embodying any one or more of the aspects and/or methodologies of the present disclosure. In another example, memory 908 may further include any number of program modules including, but not limited to, an operating system, one or more application programs, other program modules, program data, and any combinations thereof.

Computer system 900 may also include a storage device 924. Examples of a storage device (e.g., storage device 924) include, but are not limited to, a hard disk drive, a magnetic disk drive, an optical disc drive in combination with an optical medium, a solid-state memory device, and any combinations thereof. Storage device 924 may be connected to bus 912 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 924 (or one or more components thereof) may be removably interfaced with computer system 900 (e.g., via an external port connector (not shown)). Particularly, storage device 924 and an associated machine-readable medium 928 may provide nonvolatile and/or volatile storage of machine-readable instructions, data structures, program modules, and/or other data for computer system 900. In one example, software 920 may reside, completely or partially, within machine-readable medium 928. In another example, software 920 may reside, completely or partially, within processor 904.

Computer system 900 may also include an input device 932. In one example, a user of computer system 900 may enter commands and/or other information into computer system 900 via input device 932. Examples of an input device 932 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 932 may be interfaced to bus 912 via any of a variety of interfaces (not shown) including, but not limited to, a serial interface, a parallel interface, a game port, a USB interface, a FIREWIRE interface, a direct interface to bus 912, and any combinations thereof. Input device 932 may include a touch screen interface that may be a part of or separate from display 936, discussed further below. Input device 932 may be utilized as a user selection device for selecting one or more graphical representations in a graphical interface as described above.

A user may also input commands and/or other information to computer system 900 via storage device 924 (e.g., a removable disk drive, a flash drive, etc.) and/or network interface device 940. A network interface device, such as network interface device 940, may be utilized for connecting computer system 900 to one or more of a variety of networks, such as network 944, and one or more remote devices 948 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 944, may employ a wired and/or a wireless mode of communication. In general, any network topology may be used. Information (e.g., data, software 920, etc.) may be communicated to and/or from computer system 900 via network interface device 940.

Computer system 900 may further include a video display adapter 952 for communicating a displayable image to a display device, such as display device 936. Examples of a display device include, but are not limited to, a liquid crystal display (LCD), a cathode ray tube (CRT), a plasma display, a light emitting diode (LED) display, and any combinations thereof. Display adapter 952 and display device 936 may be utilized in combination with processor 904 to provide graphical representations of aspects of the present disclosure. In addition to a display device, computer system 900 may include one or more other peripheral output devices including, but not limited to, an audio speaker, a printer, and any combinations thereof. Such peripheral output devices may be connected to bus 912 via a peripheral interface 956. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A device for sorting small pieces of material into separate containers, the device comprising:

- a top portion comprising two lateral troughs, each trough including:
  - a bottom surface;
  - at least a well in the bottom surface; and
  - at least a through opening in a bottom of the at least a well;
- a bottom portion including a substantially planar surface having a plurality of openings disposed there through and a plurality of sections of unbroken surface, wherein:
  - each opening of the plurality of openings corresponds to an opening of the at least a through opening of the two lateral troughs;
  - the plurality of sections of unbroken surface includes a section of unbroken surface corresponding to each through opening of the at least a through opening of the two lateral troughs; and
  - the top portion and bottom portion are mutually slidable between a first position wherein the plurality of sections of unbroken surface are positioned beneath the at least a through opening and a second position wherein the plurality of openings are positioned beneath the at least a through opening.

2. The device of claim 1, wherein the top portion further comprises a central trough disposed between the two lateral troughs.

3. The device of claim 1 further comprising a biasing means connecting the top portion to the bottom portion, the biasing means having a bias urging the top portion and bottom portion into the first position.

4. The device of claim 1, wherein each lateral trough of the top portion comprises a plurality of wells, each with a through opening.

5. The device of claim 1, wherein the top portion further comprises a pair of lateral grooves in which the bottom portion is slidably engaged.

6. The device of claim 5, wherein the lateral grooves feature at least one locking position wherein the bottom portion is securely held in the first or second position.

7. The device of claim 1, further comprising a manual actuator, wherein the manual actuator is configured to shift the top portion and bottom portion between the first position and the second position when activated by a user.

8. The device of claim 7, wherein the manual actuator further comprises a lever having a fulcrum pivotally connected to a first portion of the top portion and the bottom portion, a distal end operated by the user, and a proximal end connected to a second portion of the top portion and the bottom portion.

9. The device of claim 8 wherein the proximal end is connected to the second portion by a crank slider having a first end pivotally connected to the proximal end and a second end pivotally connected to the second portion.

10. A method for sorting small piece of material into separate containers, wherein the method comprises:

receiving a device for sorting small pieces of material, wherein the device comprises a top portion comprising two lateral troughs each with a bottom surface, at least a well in the bottom surface, and at least a through opening in the bottom of the at least a well, wherein the bottom surface comprises a substantially planar surface with a plurality of openings, wherein each opening of the plurality of openings in the bottom portion is aligned to correspond with an opening of the at least one through opening in the two lateral troughs;

aligning, using the top portion, each opening of the plurality of openings in the bottom portion to correspond with an opening of the at least a through opening of the two lateral troughs;

aligning, using the top portion, a plurality of sections of unbroken surface of the bottom portion to correspond with each through opening of the at least a through opening of the two lateral trough;

applying, using the top portion, a second positioning of the top portion relative to the bottom portion, where the top portion and bottom portion slide between a first position where the plurality of sections of unbroken surface are positioned beneath the at least a through opening, and a second position wherein the plurality of openings are positioned beneath the at least a through opening, at a subsequent time;

allowing, when in the second position, the small pieces of material to pass through the at least a through opening of the two lateral trough, thereby sorting the material into separate containers.

11. The method of claim 10, wherein the top portion further comprises a central trough disposed between the two lateral troughs.

12. The method of claim 10, wherein the top portion further comprises a biasing means connecting the top portion to the bottom portion, wherein the biasing means having a bias urging the top portion and bottom portion into the first position.

13. The method of claim 10, wherein each lateral trough of the top portion comprises a plurality of wells, each with a through opening.

14. The method of claim 10, wherein the top portion further comprises a pair of lateral grooves in which the bottom portion is slidably engaged.

15. The method of claim 14, wherein the lateral grooves feature at least one locking position where the bottom portion is securely held in the first or second position.

16. The method of claim 10, wherein the top portion further comprises a manual actuator that shifts the top portion and bottom portion between the first position and the second position when activated by a user.

17. The method of claim 16, wherein the manual actuator further comprises a lever having a fulcrum pivotally connected to a first portion of the top portion and the bottom portion, a distal end operated by the user, and a proximal end connected to a second portion of the top portion and the bottom portion.

18. The method of claim 17, wherein the proximal end is connected to the second portion by a crank slider having a first end pivotally connected to the proximal end and a second end pivotally connected to the second portion.

* * * * *